US007810334B2

(12) United States Patent
Hsu et al.

(10) Patent No.: US 7,810,334 B2
(45) Date of Patent: Oct. 12, 2010

(54) TRANSITION DUCT FOR GAS TURBINE ENGINE

(75) Inventors: Johan Hsu, Orlando, FL (US); Andrew G. McQuiggan, Orlando, FL (US); Robert W. Dawson, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 1034 days.

(21) Appl. No.: 11/581,164

(22) Filed: Oct. 13, 2006

(65) Prior Publication Data

US 2008/0087020 A1 Apr. 17, 2008

(51) Int. Cl.
*F02C 1/00* (2006.01)
*F02G 3/00* (2006.01)

(52) U.S. Cl. .......................................................... 60/752

(58) Field of Classification Search ................... 60/752, 60/796
See application file for complete search history.

(56) References Cited

U.S. PATENT DOCUMENTS 6,644,032 B1 11/2003 Jorgensen et al.

*Primary Examiner*—Michael Cuff
*Assistant Examiner*—Andrew Nguyen

(57) ABSTRACT

A transition duct having an inlet opening and an outlet opening and a body portion extending between the inlet and outlet openings at respective inlet and outlet ends. The inlet opening defines a generally circular cross-section for the body portion and has a geometric center, and the outlet opening defines a generally rectangular arc-like cross-section. The body portion has an internal profile substantially in accordance with coordinate values X, Y and Z at an angle θ, as set forth in Table 1, where each of the X, Y and Z coordinate values are taken at a sweep angle θ passing through the section origin and measured from a first plane defined by the inlet end and increasing toward a second plane defined by the outlet end.

18 Claims, 3 Drawing Sheets

TRANSITION DUCT FOR GAS TURBINE ENGINE

FIELD OF THE INVENTION

The present invention relates to a transition duct for a gas turbine engine and, more particularly, to a transition duct design having a longer structural life and an improved aero performance.

BACKGROUND OF THE INVENTION

Generally, combustion turbines have three main assemblies, including a compressor assembly, a combustor assembly, and a turbine assembly. In operation, the compressor assembly compresses ambient air. The compressed air is channeled into the combustor assembly where it is mixed with a fuel. The fuel and compressed air mixture is ignited creating a heated working gas. The heated working gas is typically at a temperature of between 2300 to 2900° F. (1200 to 1593° C.), and is expanded through the turbine assembly. The turbine assembly generally includes a rotating assembly comprising a centrally located rotating shaft and a plurality of rows of rotating blades attached thereto. A plurality of stationary vane assemblies, each including a plurality of stationary vanes, are connected to a casing of the turbine and are located interposed between the rows of rotating blades. The expansion of the working gas through the rows of rotating blades and stationary vanes or airfoils in the turbine assembly results in a transfer of energy from the working gas to the rotating assembly, causing rotation of the shaft.

The combustor assembly typically includes a plurality of combustors arranged in an annular array about the engine. The hot working gas from each combustor is transferred to the turbine by a respective transition duct. The outlet of the combustor is generally cylindrical, and the inlet to the turbine at the exit to each transition duct generally corresponds to an arcuate sector. Accordingly, the cross-sectional shape of the transition duct must change from a generally cylindrical shape at the combustor exit to a generally rectangular arc-like shape at the turbine inlet. In addition, since the combustors are typically mounted at a radial outward location relative to the turbine inlet, the transition ducts must define a gas path extending radially inwardly in the direction of the gas flow to the turbine.

The combination of complex geometry changes as well as extreme mechanical and thermal loading seen by the transition duct create a harsh operating environment that can lead to premature deterioration, requiring repair and replacement of the transition duct. In particular, as higher firing temperatures are utilized, increased transition duct failures may occur due to low cycle fatigue (LCF) cracks that may be observed at an upper panel of the transition. Accordingly, extreme care must be taken with respect to the design of these geometric transitions to avoid sharp geometric changes that may create regions of high stress, i.e., stress concentration points.

SUMMARY OF THE INVENTION

The present invention provides a transition duct having a geometric profile that is preferably optimized to reduce high stress concentrations from LCF. The present transition duct also has an improved structural dynamic response that effectively increases the separation of the transition frequency response from the combustion resonant frequencies, while also maintaining a desired aero efficiency in transferring hot working gas from the combustor to the turbine inlet.

In accordance with one aspect of the invention, a transition duct is provided having an inlet opening and an outlet opening and a body portion extending between the inlet and outlet openings at respective inlet and outlet ends. The inlet opening defines a generally circular cross-section for the body portion and has a geometric center. The body portion has an internal profile substantially in accordance with coordinate values X, Y and Z at sections defined by a respective angle θ, as set forth in Table 1, where each of the X, Y and Z coordinates are taken at a sweep angle θ passing through the section origin and measured from a first plane defined by the inlet end and increasing toward a second plane defined by the outlet end. The first plane and the section planes intersect at an angle origin line about which the angle θ is measured. The X and Y coordinate values are determined relative to a section origin at a substantially central geometric location within each respective section. The Z coordinate values are measured along a Z-axis extending perpendicular to the first plane, and having an origin at the center of the generally circular inlet opening and increasing toward the outlet end.

In accordance with another aspect of the invention, a transition duct is provided having an inlet opening and an outlet opening and a body portion extending between the inlet and outlet openings at respective inlet and outlet ends. The inlet opening defines a generally circular cross-section for the body portion and has a geometric center. The body portion has an internal profile including first, second, third and fourth profile sections located approximately at angles θ of 1.0°, 10.0°, 21.0° and 30.0°, respectively, taken at a sweep angle θ passing through the section origin and measured from a first plane defined by the inlet end and increasing toward a second plane defined by the outlet end. The first plane and the section planes intersect at an angle origin line about which the angle θ is measured, where each section defines a Cartesian X Y coordinate origin with corresponding quadrants determined relative to the section origin at a substantially central geometric location within each respective section, wherein the first section comprises a generally circular cross-section; the second section comprises a first side extending from the third quadrant to the second quadrant, a second side extending from the fourth quadrant to the first quadrant, an outer side extending between the first and second quadrants and curved concave inwardly toward the coordinate origin, an inner side extending between the third and fourth quadrants and curved concave inwardly toward the coordinate origin, the first and second sides extending in diverging relation from the inner side toward the outer side; the third section comprises a first substantially linear side extending from the third quadrant to the second quadrant, a second substantially linear side extending from the fourth quadrant to the first quadrant, an outer side extending between the first and second quadrants and curved concave inwardly toward the coordinate origin, an inner side extending between the third and fourth quadrants and curved concave inwardly toward the coordinate origin, the first and second sides extending in diverging relation from the inner side toward the outer side; and the fourth section comprises a first substantially linear side extending from the third quadrant to the second quadrant, a second substantially linear side extending from the fourth quadrant to the first quadrant, an outer side extending between the first and second quadrants and curved concave inwardly toward the coordinate origin, an inner side extending between the third and fourth quadrants and curved concave outwardly away from the coordinate origin, the first and second sides extending in diverging relation from the inner side toward the outer side.

In accordance with a further aspect of the invention, a transition duct is provided having an inlet opening and an outlet opening and a body portion extending between the inlet and outlet openings at respective inlet and outlet ends. The inlet opening defines a generally circular cross-section for the body portion and has a geometric center. The body portion has an internal profile including first, second, third and fourth profile sections substantially in accordance with coordinate values X, Y and Z located at angles θ of 1.0°, 10.0°, 21.0° and 30.0°, as set forth in Table 1, where each of the X, Y and Z coordinates are taken at a sweep angle θ passing through the section origin and measured from a first plane defined by the inlet end and increasing toward a second plane defined by the outlet end. The first plane and the section planes intersect at an angle origin line about which the angle θ is measured. The X and Y coordinate values are determined relative to a section origin at a substantially central geometric location within each respective section. The Z coordinate values are measured along a Z-axis extending perpendicular to the first plane, and having an origin at the center of the generally circular inlet opening and increasing toward the outlet end.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

Figure 1:
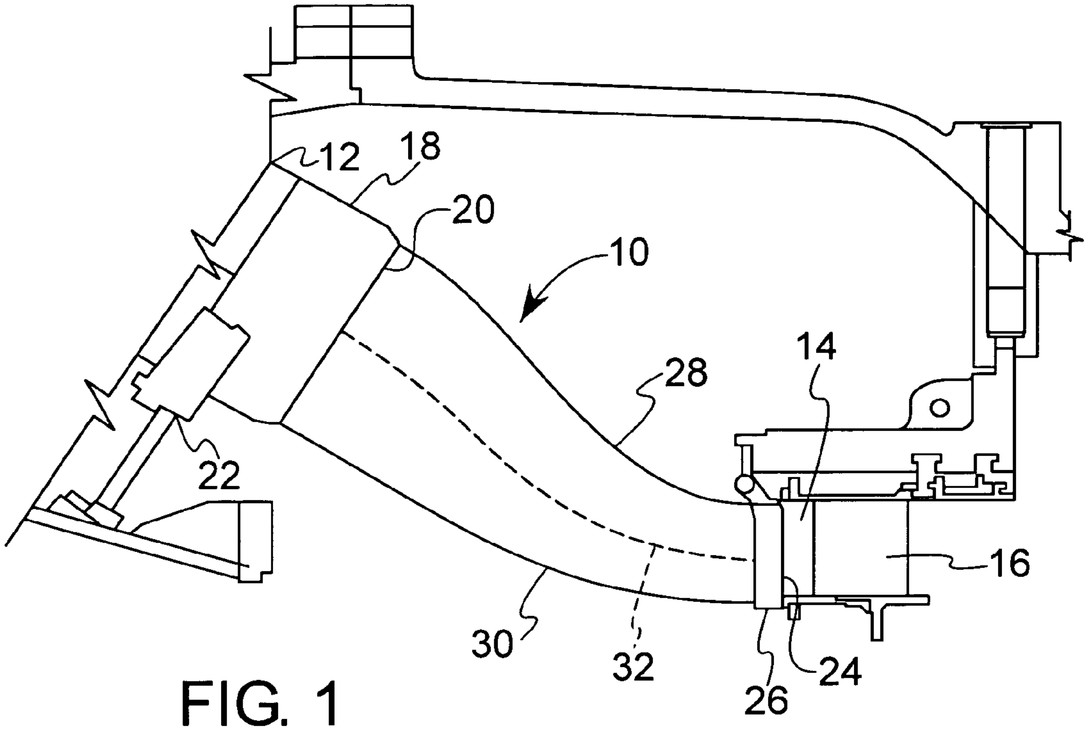
FIG. 1 is side elevation view of a portion of a gas turbine engine including a transition duct extending from a combustor to the entrance to a turbine section.
Figure 7:
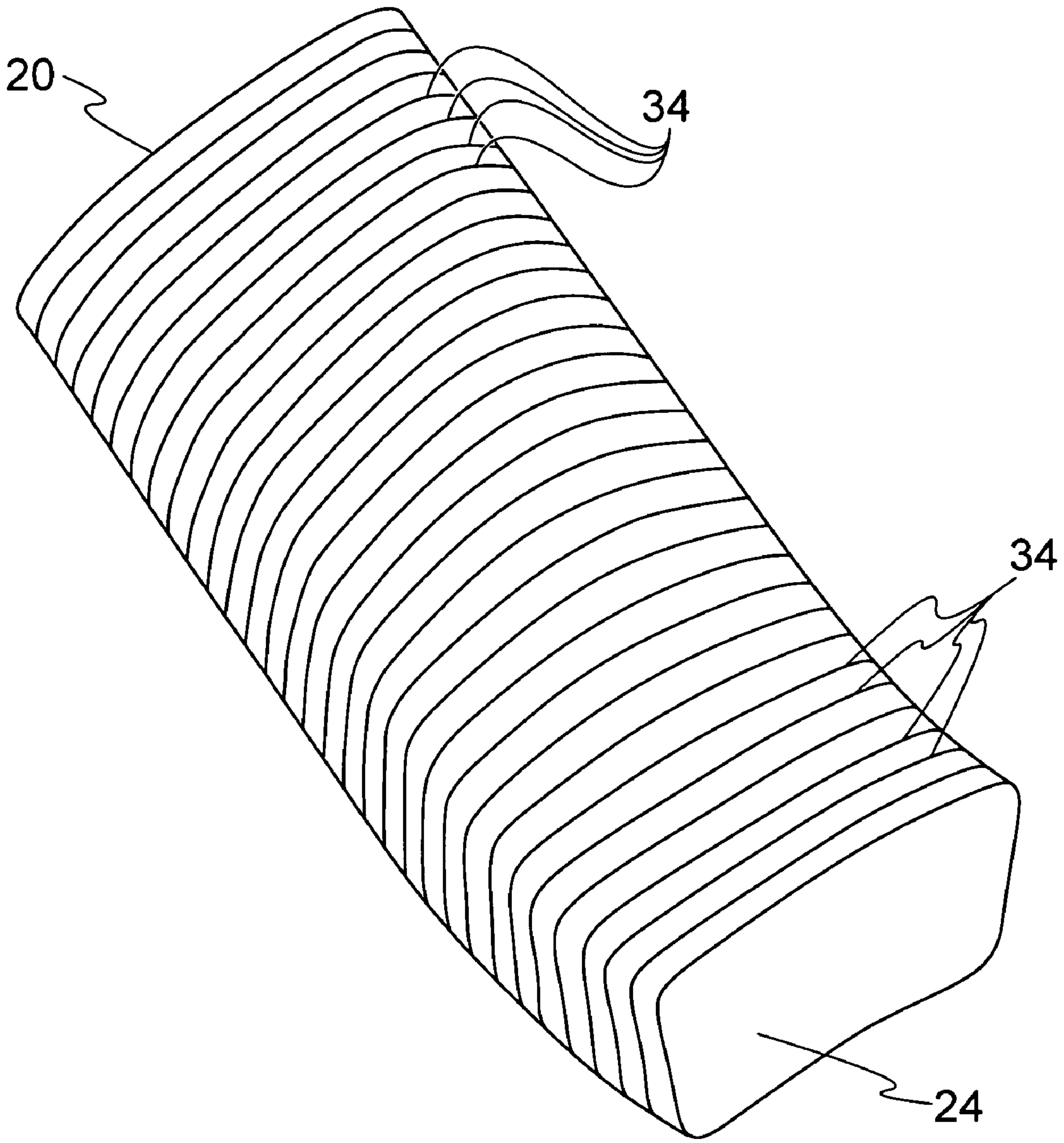
FIG. 7 is a perspective view illustrating each of the section planes used to define the transition profile of the present invention.

Referring to FIG. 1, the present invention comprises a profile defining the interior surface of a transition duct 10. The transition duct 10 provides a conduit for conveying hot combustion gases from a combustor 12 for a gas turbine engine to the entrance 14 of a turbine assembly where the gases are directed toward a first row of vanes 16. An inlet ring 18 of generally circular cross-section may be provided at an inlet end 20 of the transition duct 10, supported by an inlet support 22. An outlet end 24 of the transition duct 10 may include an aft frame 26 having a generally rectangular arc-like shape. As is described further below, the transition duct 10 has a geometric profile that transitions from a generally circular cross-section, substantially corresponding to the shape of the outlet from the combustor 12, to a generally rectangular arc-like cross-section at the turbine entrance 14 (see also FIG. 7), while also defining a radially inwardly extending path for the gas flow.

The transition duct 10 may be formed by any known manufacturing process, and may comprise a body formed of an upper panel 28 and a lower panel 30 joined along longitudinally extending seams 32 (one illustrated) at longitudinal welds to form a panel assembly, as is known in the art. The upper and lower panels 28, 30 may also be provided with cooling holes in a manner known in the art. In addition, the upper and lower panels 28, 30 may be formed of a high temperature material such as a high temperature metal alloy including, without limitation, IN617 (Inconel 617) or H230 (Haynes 230). It should be noted that the transition duct 10 is not limited to any particular construction, and the invention encompasses any transition duct 10 that utilizes the profile described further below.

The interior surface of the body formed by the panels 28, 30 may preferably be provided with a coating to protect the interior of the transition duct 10 from deterioration, such as may be caused by prolonged exposure to the hot combustion gases traveling from the combustor 12. The coating may comprise a known coating material, such as is described in U.S. Pat. No. 6,644,032, incorporated herein by reference, or any other coating having similar protective properties. In addition, the coating is preferably a thin coating layer that will not substantially affect the beneficial profile characteristics provided by the present invention.

Figure 2:
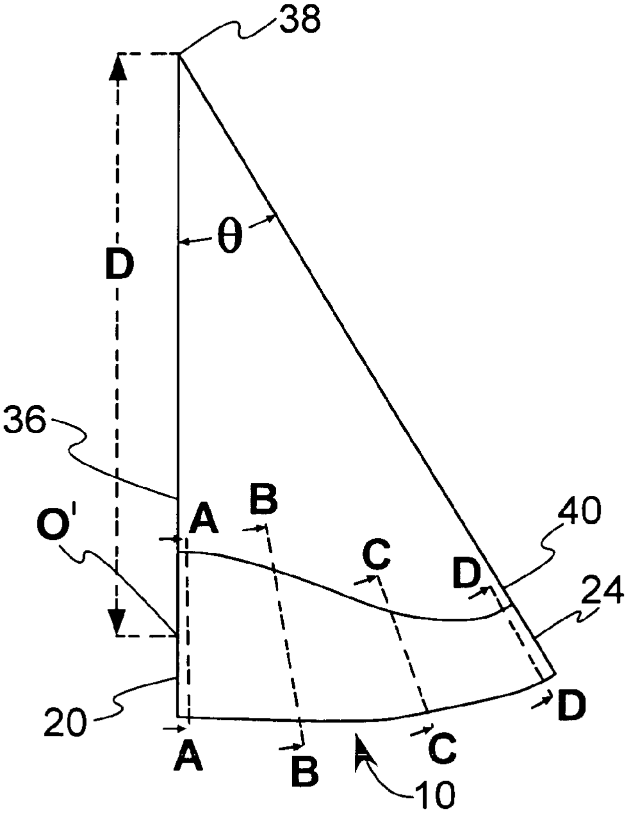
FIG. 2 is a cross-section view illustrating the coordinate system used to define the profile of the transition duct.

The profile of the transition duct 10 is described herein with reference to the uncoated surface profile of the interior surface of the body defined by the upper and lower panels 28, 30. Referring to FIG. 2, the profile of the transition duct 10 is described with reference to an angle θ to identify a location of a discrete section 34 (FIG. 7), i.e., a transverse cross-section, of the transition duct 10. In particular, each section 34 defines an origin located substantially at a geometric center of the section 34, as is illustrated for example by section origins O', $O_A$, $O_B$, $O_C$ and $O_D$ in FIGS. 2-6. The angle θ identifying a particular discrete section 34 is a sweep angle measured between a first plane 36 defined by a section 34 at the inlet end 20 and a plane passing through the origin of the particular discrete section 34. The first plane 36 and the planes defined by the sections 34 intersect at an angle origin line 38 about which the angle θ is measured, where the line 38 is a distance D approximately 1223 mm from the section origin O' at the inlet end 20. The value of the sweep angle θ increases from the first plane 36 toward a second plane 40 defined by the outlet end 24, where the total sweep angle of the illustrated transition duct 10 is approximately 31.07°.

Coordinate values X, Y and Z are provided to identify points on the transition duct 10 for each discrete section 34 at specified angles θ substantially in accordance with the X, Y and Z coordinate values as set forth in Table 1 below. The values given in Table 1 are in millimeters. However, it should be understood that the present invention is not limited to particular dimensions, in that the X, Y and Z values given in Table 1 could be scaled up or down, i.e., may represent unitless scaled values, depending on the diameter of the particular combustion liner with which the transition duct 10 of the present invention is intended to be used.

Further, it should be noted that the coordinate values given in Table 1 correspond to coordinates on the transition duct 10 when at room temperature, and that the given coordinate values will not necessarily correspond to the location of particular points on the transition duct 10 when the transition duct 10 is at an elevated temperature during transfer of hot combustion gases.

The X and Y coordinate values are determined with reference to respective X and Y axes having a zero point or origin of a Cartesian coordinate system at the origin of the particular section 34 located substantially at the geometric center within each respective section 34 (see FIGS. 3-6). The Z coordinate values are measured along a Z-axis extending perpendicular to the first plane 36, and having an origin at the center of the section 34 defined at the generally circular inlet opening of the inlet end 20, and the Z values increase in the direction extending toward the outlet end 40. The data in Table 1 corresponds to 1 degree increments of the angle θ, provided to define an optimized internal profile for the transition duct 10, It should be apparent that although the X, Y and Z coordinate values given in Table 1 provide discrete sections 34 comprising wireframe sections for defining the transition profile, the entire profile is defined by a best-fit curve to the given sections to define a smoothly continuous internal flow path formed by the interior surface of the transition duct 10. Further it may be noted that the data provided in Table 1 is computer generated and that limited deviations from this data may occur, within manufacturing tolerances, during production of the transition duct 10.

Figure 3:
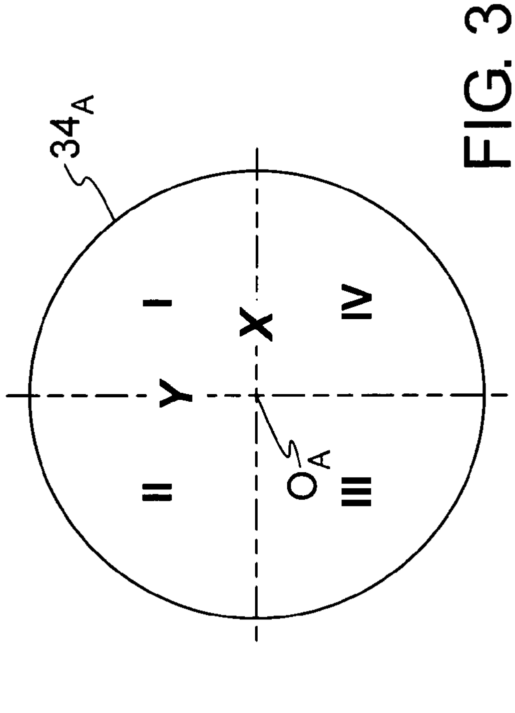
FIG. 3 is section view taken through the transition duct along section lines A-A in FIG. 2.
Figure 4:
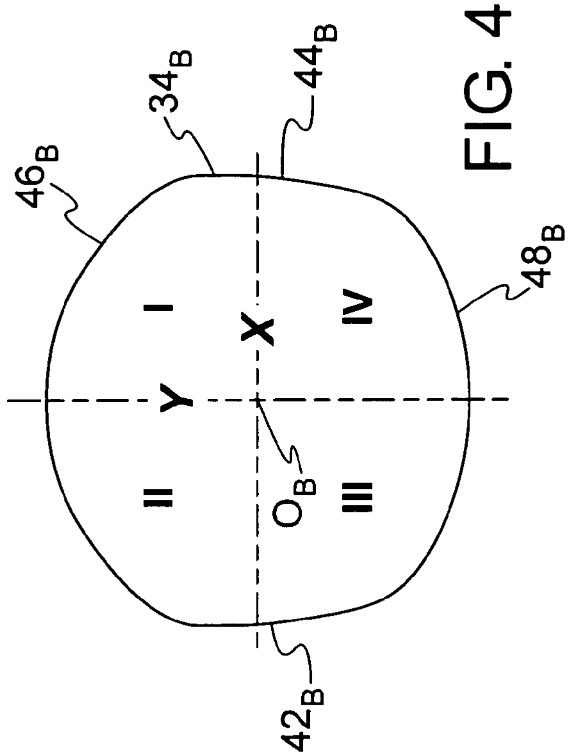
FIG. 4 is section view taken through the transition duct along section lines B-B in FIG. 2.
Figure 5:
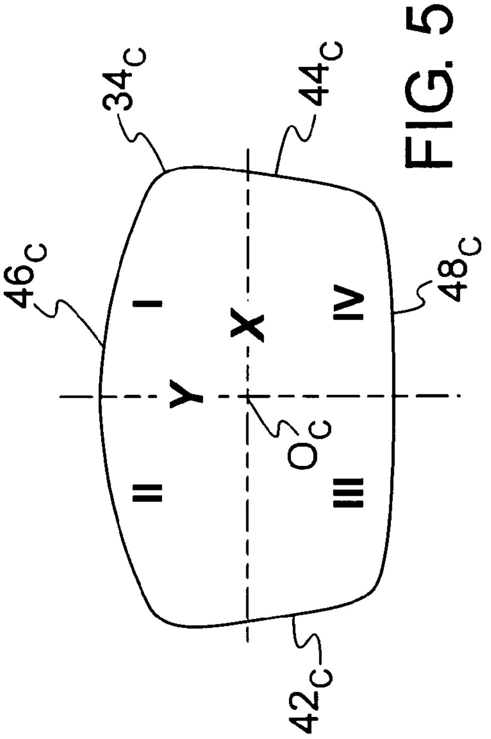
FIG. 5 is section view taken through the transition duct along section lines C-C in FIG. 2.
Figure 6:
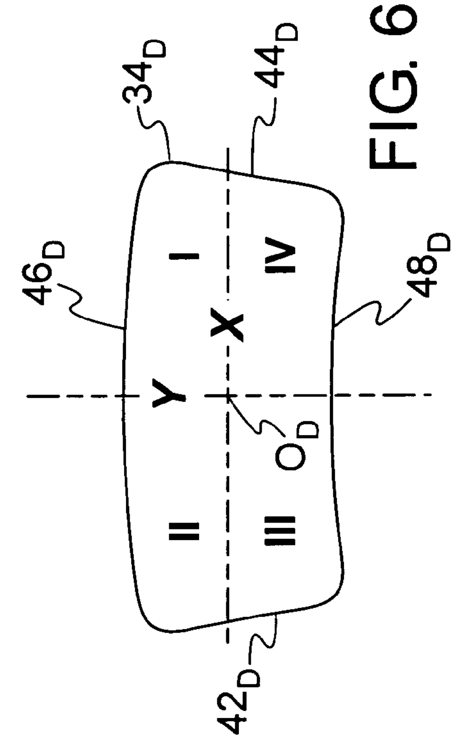
FIG. 6 is section view taken through the transition duct along section lines D-D in FIG. 2.

Referring to FIGS. 3-6 first, second, third and fourth sections $34_A$, $34_B$, $34_C$ and $34_D$ depict the transition of the internal profile from the generally circular first cross-section $34_A$ of FIG. 3, taken at θ=1°, to the generally rectangular arc-like fourth cross-section $34_D$ of FIG. 6, taken at θ=30°. Each section may define a Cartesian X Y coordinate origin, as depicted by the section origins $O_A$, $O_B$, $O_C$ and $O_D$, with corresponding quadrants I, II, III and IV determined relative each respective section origin. The quadrants are numbered sequentially in accordance with a conventional Cartesian coordinate system, starting in the upper right-hand quadrant and proceeding counterclockwise.

The second section $34_B$ of FIG. 4 is taken at θ=10° and comprises a first side $42_B$ extending from the third quadrant to the second quadrant, and a second side $44_B$ extending from the fourth quadrant to the first quadrant. An outer side $46_B$ extends between the first and second quadrants and curves concave inwardly toward the coordinate origin $O_B$, and an inner side $48_B$ extends between the third and fourth quadrants and curves concave inwardly toward the coordinate origin $O_B$. The first and second sides $42_B$, $44_B$ extend in diverging relation from the inner side $48_B$ toward the outer side $46_B$.

The third section $34_C$ of FIG. 5 is taken at θ=21' and defines a generally expanded rectangular cross-section comprising a first substantially linear side $42_C$ extending from the third quadrant to the second quadrant, and a second substantially linear side $44_C$ extending from the fourth quadrant to the first quadrant. An outer side $46_C$ extends between the first and second quadrants and curves concave inwardly toward the coordinate origin $O_C$, and an inner side $48_C$ extends between the third and fourth quadrants and curves concave inwardly toward the coordinate origin $O_C$, where the outer and inner sides $46_C$, $48_C$ have substantially less curvature than the outer and inner sides $46_B$, $48_B$ of the second section $34_B$. The first and second sides $42_C$, $44_C$ extend in diverging relation from the inner side $48_C$ toward the outer side $46_C$.

The fourth section $34_D$ of FIG. 6 comprises a first substantially linear side $42_D$ extending from the third quadrant to the second quadrant, and a second substantially linear side $44_D$ extending from the fourth quadrant to the first quadrant. An outer side $46_D$ extends between the first and second quadrants and curves concave inwardly toward the coordinate origin $O_D$, and an inner side $48_D$ extends between the third and fourth quadrants and curves concave outwardly away from the coordinate origin $O_D$, where the outer and inner sides $46_D$, $48_D$ have substantially less curvature than the outer and inner sides $46_D$, $48_D$ of the third section $34_C$. The first and second sides $42_D$, $44_D$ extend in diverging relation from the inner side $48_D$ toward the outer side $46_D$.

As an alternative embodiment to the invention the internal profile may be provided within an envelope of the profile given by the coordinate values of Table 1. By way of example and without limitation, the internal profile described herein may be provided within an envelope of ±6.350 mm normal to any surface with the X, Y and Z coordinate values and the angles θ noted in Table 1.

The transition duct 10 described herein provides a preferred transition duct internal profile for transitioning from a generally circular inlet to a generally rectangular arc-like outlet while minimizing stress concentrations and providing frequency separation between the natural frequency of the transition duct 10 and the combustion resonant frequencies, resulting in a reduced likelihood of low cycle fatigue cracks.

The X, Y and Z coordinate values, determined by the above-described Cartesian coordinated system, identified at corresponding sweep angles θ are summarized in the following Table 1.

TABLE 1

| θ | X | Y | Z |
|---|---|---|---|
| 1.0 | 0.000 | 174.094 | 18.310 |
| 1.0 | 27.361 | 171.930 | 18.348 |
| 1.0 | 54.047 | 165.510 | 18.460 |
| 1.0 | 79.411 | 155.021 | 18.643 |
| 1.0 | 102.856 | 140.749 | 18.892 |
| 1.0 | 123.849 | 123.068 | 19.200 |
| 1.0 | 141.929 | 102.418 | 19.561 |
| 1.0 | 156.693 | 79.282 | 19.965 |
| 1.0 | 167.221 | 53.951 | 20.407 |
| 1.0 | 172.981 | 27.122 | 20.875 |
| 1.0 | 174.705 | −0.271 | 21.353 |
| 1.0 | 172.481 | −27.629 | 21.831 |
| 1.0 | 166.351 | −54.383 | 22.298 |
| 1.0 | 156.392 | −79.957 | 22.744 |
| 1.0 | 142.206 | −103.440 | 23.154 |
| 1.0 | 124.128 | −124.084 | 23.515 |
| 1.0 | 103.029 | −141.638 | 23.821 |
| 1.0 | 79.494 | −155.761 | 24.067 |
| 1.0 | 54.074 | −166.115 | 24.248 |
| 1.0 | 27.365 | −172.441 | 24.359 |
| 1.0 | 0.000 | −174.571 | 24.396 |
| 1.0 | −27.365 | −172.441 | 24.359 |
| 1.0 | −54.074 | −166.115 | 24.248 |
| 1.0 | −79.494 | −155.761 | 24.067 |
| 1.0 | −103.029 | −141.638 | 23.821 |
| 1.0 | −124.128 | −124.084 | 23.515 |
| 1.0 | −142.206 | −103.440 | 23.154 |
| 1.0 | −156.392 | −79.957 | 22.744 |
| 1.0 | −166.351 | −54.383 | 22.298 |
| 1.0 | −172.481 | −27.629 | 21.831 |
| 1.0 | −174.705 | −0.271 | 21.353 |
| 1.0 | −172.981 | 27.122 | 20.875 |
| 1.0 | −167.221 | 53.951 | 20.407 |
| 1.0 | −156.693 | 79.282 | 19.965 |
| 1.0 | −141.929 | 102.418 | 19.561 |
| 1.0 | −123.849 | 123.068 | 19.200 |
| 1.0 | −102.856 | 140.749 | 18.892 |
| 1.0 | −79.411 | 155.021 | 18.643 |
| 1.0 | −54.047 | 165.510 | 18.460 |
| 1.0 | −27.361 | 171.930 | 18.348 |
| 2.0 | 0.000 | 172.882 | 36.673 |
| 2.0 | 27.425 | 170.707 | 36.749 |
| 2.0 | 54.172 | 164.267 | 36.974 |
| 2.0 | 79.605 | 153.780 | 37.340 |
| 2.0 | 103.155 | 139.561 | 37.837 |
| 2.0 | 124.329 | 122.002 | 38.450 |
| 2.0 | 142.717 | 101.544 | 39.164 |
| 2.0 | 157.939 | 78.639 | 39.964 |
| 2.0 | 168.504 | 53.281 | 40.850 |
| 2.0 | 173.677 | 26.280 | 41.793 |
| 2.0 | 175.011 | −1.190 | 42.752 |
| 2.0 | 172.708 | −28.597 | 43.709 |
| 2.0 | 166.805 | −55.460 | 44.647 |
| 2.0 | 157.321 | −81.274 | 45.548 |
| 2.0 | 143.277 | −104.895 | 46.373 |
| 2.0 | 124.908 | −125.350 | 47.088 |
| 2.0 | 103.514 | −142.641 | 47.691 |

TABLE 1-continued

| θ | X | Y | Z |
|---|---|---|---|
| 2.0 | 79.778 | −156.547 | 48.177 |
| 2.0 | 54.227 | −166.748 | 48.533 |
| 2.0 | 27.432 | −172.989 | 48.751 |
| 2.0 | 0.000 | −175.094 | 48.825 |
| 2.0 | −27.433 | −172.989 | 48.751 |
| 2.0 | −54.228 | −166.748 | 48.533 |
| 2.0 | −79.779 | −156.547 | 48.177 |
| 2.0 | −103.515 | −142.640 | 47.691 |
| 2.0 | −124.908 | −125.349 | 47.088 |
| 2.0 | −143.278 | −104.894 | 46.373 |
| 2.0 | −157.321 | −81.274 | 45.548 |
| 2.0 | −166.805 | −55.459 | 44.647 |
| 2.0 | −172.708 | −28.597 | 43.709 |
| 2.0 | −175.011 | −1.190 | 42.752 |
| 2.0 | −173.677 | 26.281 | 41.793 |
| 2.0 | −168.504 | 53.281 | 40.850 |
| 2.0 | −157.939 | 78.639 | 39.964 |
| 2.0 | −142.717 | 101.545 | 39.164 |
| 2.0 | −124.329 | 122.002 | 38.450 |
| 2.0 | −103.154 | 139.561 | 37.837 |
| 2.0 | −79.605 | 153.780 | 37.340 |
| 2.0 | −54.172 | 164.267 | 36.974 |
| 2.0 | −27.425 | 170.707 | 36.749 |
| 3.0 | 0.000 | 170.905 | 55.141 |
| 3.0 | 27.478 | 168.722 | 55.256 |
| 3.0 | 54.277 | 162.274 | 55.594 |
| 3.0 | 79.774 | 151.808 | 56.142 |
| 3.0 | 103.427 | 137.665 | 56.883 |
| 3.0 | 124.785 | 120.255 | 57.796 |
| 3.0 | 143.484 | 100.021 | 58.856 |
| 3.0 | 159.159 | 77.375 | 60.043 |
| 3.0 | 169.755 | 52.007 | 61.372 |
| 3.0 | 174.377 | 24.875 | 62.794 |
| 3.0 | 175.350 | −2.646 | 64.237 |
| 3.0 | 172.969 | −30.082 | 65.675 |
| 3.0 | 167.263 | −57.025 | 67.087 |
| 3.0 | 158.221 | −83.037 | 68.450 |
| 3.0 | 144.337 | −106.783 | 69.694 |
| 3.0 | 125.685 | −127.030 | 70.755 |
| 3.0 | 103.987 | −144.013 | 71.645 |
| 3.0 | 80.044 | −157.662 | 72.361 |
| 3.0 | 54.364 | −167.676 | 72.886 |
| 3.0 | 27.488 | −173.809 | 73.207 |
| 3.0 | −0.001 | −175.880 | 73.315 |
| 3.0 | −27.491 | −173.809 | 73.207 |
| 3.0 | −54.366 | −167.676 | 72.885 |
| 3.0 | −80.046 | −157.661 | 72.361 |
| 3.0 | −103.988 | −144.012 | 71.645 |
| 3.0 | −125.687 | −127.029 | 70.755 |
| 3.0 | −144.338 | −106.782 | 69.694 |
| 3.0 | −158.222 | −83.036 | 68.450 |
| 3.0 | −167.263 | −57.024 | 67.086 |
| 3.0 | −172.969 | −30.081 | 65.674 |
| 3.0 | −175.350 | −2.645 | 64.237 |
| 3.0 | −174.377 | 24.876 | 62.794 |
| 3.0 | −169.755 | 52.008 | 61.372 |
| 3.0 | −159.158 | 77.376 | 60.043 |
| 3.0 | −143.484 | 100.022 | 58.856 |
| 3.0 | −124.785 | 120.255 | 57.796 |
| 3.0 | −103.427 | 137.665 | 56.883 |
| 3.0 | −79.774 | 151.808 | 56.142 |
| 3.0 | −54.277 | 162.275 | 55.594 |
| 3.0 | −27.478 | 168.722 | 55.256 |
| 4.0 | 0.000 | 168.192 | 73.764 |
| 4.0 | 27.518 | 166.005 | 73.917 |
| 4.0 | 54.359 | 159.563 | 74.367 |
| 4.0 | 79.914 | 149.138 | 75.096 |
| 4.0 | 103.668 | 135.097 | 76.078 |
| 4.0 | 125.210 | 117.866 | 77.283 |
| 4.0 | 144.222 | 97.888 | 78.680 |
| 4.0 | 160.345 | 75.533 | 80.243 |
| 4.0 | 170.973 | 50.178 | 82.016 |
| 4.0 | 175.077 | 22.952 | 83.920 |
| 4.0 | 175.712 | −4.593 | 85.846 |
| 4.0 | 173.252 | −32.037 | 87.765 |
| 4.0 | 167.719 | −59.031 | 89.653 |
| 4.0 | 159.088 | −85.199 | 91.483 |

TABLE 1-continued

| θ | X | Y | Z |
|---|---|---|---|
| 4.0 | 145.377 | −109.054 | 93.151 |
| 4.0 | 126.454 | −129.070 | 94.550 |
| 4.0 | 104.440 | −145.696 | 95.713 |
| 4.0 | 80.288 | −159.044 | 96.646 |
| 4.0 | 54.480 | −168.836 | 97.331 |
| 4.0 | 27.533 | −174.836 | 97.751 |
| 4.0 | −0.001 | −176.864 | 97.892 |
| 4.0 | −27.536 | −174.836 | 97.751 |
| 4.0 | −54.483 | −168.835 | 97.331 |
| 4.0 | −80.290 | −159.043 | 96.646 |
| 4.0 | −104.442 | −145.695 | 95.713 |
| 4.0 | −126.455 | −129.068 | 94.550 |
| 4.0 | −145.378 | −109.052 | 93.150 |
| 4.0 | −159.088 | −85.198 | 91.482 |
| 4.0 | −167.720 | −59.029 | 89.653 |
| 4.0 | −173.252 | −32.035 | 87.765 |
| 4.0 | −175.712 | −4.592 | 85.846 |
| 4.0 | −175.077 | 22.953 | 83.920 |
| 4.0 | −170.972 | 50.179 | 82.016 |
| 4.0 | −160.345 | 75.534 | 80.243 |
| 4.0 | −144.222 | 97.888 | 78.680 |
| 4.0 | −125.209 | 117.866 | 77.283 |
| 4.0 | −103.667 | 135.098 | 76.078 |
| 4.0 | −79.913 | 149.138 | 75.096 |
| 4.0 | −54.359 | 159.563 | 74.367 |
| 4.0 | −27.518 | 166.005 | 73.917 |
| 5.0 | 0.000 | 164.766 | 92.589 |
| 5.0 | 27.545 | 162.582 | 92.780 |
| 5.0 | 54.416 | 156.161 | 93.342 |
| 5.0 | 80.020 | 145.800 | 94.248 |
| 5.0 | 103.871 | 131.890 | 95.465 |
| 5.0 | 125.598 | 114.869 | 96.954 |
| 5.0 | 144.925 | 95.182 | 98.677 |
| 5.0 | 161.493 | 73.152 | 100.604 |
| 5.0 | 172.156 | 47.836 | 102.819 |
| 5.0 | 175.772 | 20.554 | 105.206 |
| 5.0 | 176.088 | −6.987 | 107.615 |
| 5.0 | 173.547 | −34.413 | 110.015 |
| 5.0 | 168.167 | −61.430 | 112.378 |
| 5.0 | 159.916 | −87.715 | 114.678 |
| 5.0 | 146.389 | −111.656 | 116.773 |
| 5.0 | 127.203 | −131.416 | 118.501 |
| 5.0 | 104.866 | −147.631 | 119.920 |
| 5.0 | 80.503 | −160.632 | 121.058 |
| 5.0 | 54.573 | −170.163 | 121.891 |
| 5.0 | 27.564 | −176.005 | 122.402 |
| 5.0 | −0.001 | −177.981 | 122.575 |
| 5.0 | −27.567 | −176.004 | 122.402 |
| 5.0 | −54.575 | −170.162 | 121.891 |
| 5.0 | −80.505 | −160.631 | 121.057 |
| 5.0 | −104.868 | −147.630 | 119.920 |
| 5.0 | −127.205 | −131.414 | 118.501 |
| 5.0 | −146.390 | −111.654 | 116.773 |
| 5.0 | −159.917 | −87.713 | 114.678 |
| 5.0 | −168.168 | −61.428 | 112.378 |
| 5.0 | −173.547 | −34.412 | 110.015 |
| 5.0 | −176.088 | −6.986 | 107.615 |
| 5.0 | −175.772 | 20.556 | 105.206 |
| 5.0 | −172.156 | 47.837 | 102.819 |
| 5.0 | −161.492 | 73.152 | 100.604 |
| 5.0 | −144.925 | 95.183 | 98.677 |
| 5.0 | −125.598 | 114.869 | 96.954 |
| 5.0 | −103.871 | 131.890 | 95.465 |
| 5.0 | −80.019 | 145.800 | 94.248 |
| 5.0 | −54.416 | 156.161 | 93.342 |
| 5.0 | −27.545 | 162.582 | 92.780 |
| 6.0 | 0.000 | 160.653 | 111.664 |
| 6.0 | 27.555 | 158.476 | 111.892 |
| 6.0 | 54.443 | 152.093 | 112.563 |
| 6.0 | 80.088 | 141.822 | 113.643 |
| 6.0 | 104.034 | 128.074 | 115.088 |
| 6.0 | 125.945 | 111.300 | 116.851 |
| 6.0 | 145.588 | 91.942 | 118.886 |
| 6.0 | 162.596 | 70.273 | 121.163 |
| 6.0 | 173.303 | 45.027 | 123.816 |
| 6.0 | 176.456 | 17.726 | 126.686 |
| 6.0 | 176.468 | −9.782 | 129.577 |

TABLE 1-continued

| θ | X | Y | Z |
|---|---|---|---|
| 6.0 | 173.844 | −37.167 | 132.455 |
| 6.0 | 168.600 | −64.176 | 135.294 |
| 6.0 | 160.700 | −90.536 | 138.065 |
| 6.0 | 147.365 | −114.539 | 140.588 |
| 6.0 | 127.924 | −134.013 | 142.634 |
| 6.0 | 105.257 | −149.761 | 144.290 |
| 6.0 | 80.682 | −162.364 | 145.614 |
| 6.0 | 54.637 | −171.595 | 146.584 |
| 6.0 | 27.579 | −177.251 | 147.179 |
| 6.0 | −0.002 | −179.166 | 147.380 |
| 6.0 | −27.583 | −177.251 | 147.179 |
| 6.0 | −54.640 | −171.594 | 146.584 |
| 6.0 | −80.685 | −162.362 | 145.614 |
| 6.0 | −105.260 | −149.759 | 144.289 |
| 6.0 | −127.926 | −134.011 | 142.634 |
| 6.0 | −147.367 | −114.537 | 140.587 |
| 6.0 | −160.701 | −90.534 | 138.064 |
| 6.0 | −168.601 | −64.174 | 135.294 |
| 6.0 | −173.844 | −37.164 | 132.455 |
| 6.0 | −176.468 | −9.780 | 129.577 |
| 6.0 | −176.456 | 17.728 | 126.686 |
| 6.0 | −173.303 | 45.029 | 123.816 |
| 6.0 | −162.595 | 70.274 | 121.163 |
| 6.0 | −145.587 | 91.943 | 118.885 |
| 6.0 | −125.944 | 111.301 | 116.851 |
| 6.0 | −104.033 | 128.075 | 115.088 |
| 6.0 | −80.088 | 141.822 | 113.643 |
| 6.0 | −54.443 | 152.093 | 112.563 |
| 6.0 | −27.555 | 158.477 | 111.892 |
| 7.0 | 0.000 | 155.873 | 131.034 |
| 7.0 | 27.547 | 153.713 | 131.300 |
| 7.0 | 54.438 | 147.386 | 132.076 |
| 7.0 | 80.114 | 137.235 | 133.323 |
| 7.0 | 104.149 | 123.687 | 134.986 |
| 7.0 | 126.244 | 107.197 | 137.011 |
| 7.0 | 146.202 | 88.209 | 139.342 |
| 7.0 | 163.648 | 66.944 | 141.954 |
| 7.0 | 174.411 | 41.801 | 145.041 |
| 7.0 | 177.125 | 14.519 | 148.390 |
| 7.0 | 176.844 | −12.926 | 151.760 |
| 7.0 | 174.136 | −40.241 | 155.114 |
| 7.0 | 169.012 | −67.211 | 158.426 |
| 7.0 | 161.438 | −93.606 | 161.667 |
| 7.0 | 148.300 | −117.643 | 164.618 |
| 7.0 | 128.612 | −136.798 | 166.970 |
| 7.0 | 105.612 | −152.017 | 168.838 |
| 7.0 | 80.830 | −164.172 | 170.331 |
| 7.0 | 54.680 | −173.062 | 171.423 |
| 7.0 | 27.588 | −178.509 | 172.091 |
| 7.0 | 0.010 | −180.355 | 172.318 |
| 7.0 | −27.569 | −178.512 | 172.092 |
| 7.0 | −54.662 | −173.067 | 171.423 |
| 7.0 | −80.814 | −164.178 | 170.332 |
| 7.0 | −105.598 | −152.025 | 168.839 |
| 7.0 | −128.599 | −136.807 | 166.971 |
| 7.0 | −148.292 | −117.655 | 164.619 |
| 7.0 | −161.433 | −93.619 | 161.668 |
| 7.0 | −169.009 | −67.223 | 158.427 |
| 7.0 | −174.135 | −40.252 | 155.115 |
| 7.0 | −176.843 | −12.936 | 151.761 |
| 7.0 | −177.125 | 14.510 | 148.392 |
| 7.0 | −174.413 | 41.794 | 145.042 |
| 7.0 | −163.652 | 66.938 | 141.954 |
| 7.0 | −146.207 | 88.205 | 139.343 |
| 7.0 | −126.248 | 107.194 | 137.011 |
| 7.0 | −104.153 | 123.684 | 134.987 |
| 7.0 | −80.117 | 137.234 | 133.323 |
| 7.0 | −54.440 | 147.386 | 132.076 |
| 7.0 | −27.548 | 153.712 | 131.300 |
| 8.0 | 0.000 | 150.453 | 150.745 |
| 8.0 | 27.522 | 148.316 | 151.046 |
| 8.0 | 54.400 | 142.068 | 151.924 |
| 8.0 | 80.099 | 132.068 | 153.329 |
| 8.0 | 104.221 | 118.755 | 155.200 |
| 8.0 | 126.500 | 102.592 | 157.472 |
| 8.0 | 146.774 | 84.018 | 160.082 |
| 8.0 | 164.654 | 63.197 | 163.008 |

TABLE 1-continued

| θ | X | Y | Z |
|---|---|---|---|
| 8.0 | 175.481 | 38.190 | 166.523 |
| 8.0 | 177.772 | 10.961 | 170.350 |
| 8.0 | 177.208 | −16.391 | 174.194 |
| 8.0 | 174.411 | −43.608 | 178.019 |
| 8.0 | 169.390 | −70.510 | 181.800 |
| 8.0 | 162.112 | −96.900 | 185.509 |
| 8.0 | 149.165 | −120.935 | 188.887 |
| 8.0 | 129.228 | −139.730 | 191.528 |
| 8.0 | 105.893 | −154.354 | 193.583 |
| 8.0 | 80.907 | −166.003 | 195.220 |
| 8.0 | 54.660 | −174.510 | 196.416 |
| 8.0 | 27.550 | −179.718 | 197.148 |
| 8.0 | −0.008 | −181.481 | 197.396 |
| 8.0 | −27.565 | −179.716 | 197.148 |
| 8.0 | −54.674 | −174.507 | 196.416 |
| 8.0 | −80.919 | −165.998 | 195.220 |
| 8.0 | −105.904 | −154.348 | 193.582 |
| 8.0 | −129.238 | −139.723 | 191.527 |
| 8.0 | −149.172 | −120.927 | 188.885 |
| 8.0 | −162.115 | −96.890 | 185.507 |
| 8.0 | −169.393 | −70.501 | 181.798 |
| 8.0 | −174.413 | −43.599 | 178.018 |
| 8.0 | −177.208 | −16.383 | 174.193 |
| 8.0 | −177.772 | 10.968 | 170.349 |
| 8.0 | −175.480 | 38.196 | 166.522 |
| 8.0 | −164.651 | 63.201 | 163.008 |
| 8.0 | −146.771 | 84.021 | 160.082 |
| 8.0 | −126.497 | 102.595 | 157.471 |
| 8.0 | −104.218 | 118.757 | 155.200 |
| 8.0 | −80.097 | 132.069 | 153.329 |
| 8.0 | −54.399 | 142.069 | 151.924 |
| 8.0 | −27.521 | 148.316 | 151.046 |
| 9.0 | 0.000 | 144.421 | 170.840 |
| 9.0 | 27.473 | 142.316 | 171.173 |
| 9.0 | 54.320 | 136.173 | 172.146 |
| 9.0 | 80.029 | 126.361 | 173.700 |
| 9.0 | 104.231 | 113.330 | 175.764 |
| 9.0 | 126.692 | 97.543 | 178.265 |
| 9.0 | 147.281 | 79.433 | 181.133 |
| 9.0 | 165.594 | 59.110 | 184.352 |
| 9.0 | 176.502 | 34.280 | 188.285 |
| 9.0 | 178.393 | 7.147 | 192.582 |
| 9.0 | 177.554 | −20.077 | 196.894 |
| 9.0 | 174.669 | −47.165 | 201.184 |
| 9.0 | 169.740 | −73.962 | 205.429 |
| 9.0 | 162.737 | −100.305 | 209.601 |
| 9.0 | 149.987 | −124.306 | 213.402 |
| 9.0 | 129.815 | −142.703 | 216.316 |
| 9.0 | 106.151 | −156.667 | 218.528 |
| 9.0 | 80.976 | −167.761 | 220.285 |
| 9.0 | 54.654 | −175.849 | 221.566 |
| 9.0 | 27.548 | −180.798 | 222.350 |
| 9.0 | 0.035 | −182.477 | 222.616 |
| 9.0 | −27.482 | −180.806 | 222.351 |
| 9.0 | −54.594 | −175.864 | 221.568 |
| 9.0 | −80.921 | −167.781 | 220.288 |
| 9.0 | −106.102 | −156.692 | 218.532 |
| 9.0 | −129.772 | −142.732 | 216.320 |
| 9.0 | −149.957 | −124.344 | 213.408 |
| 9.0 | −162.724 | −100.348 | 209.608 |
| 9.0 | −169.731 | −74.003 | 205.435 |
| 9.0 | −174.663 | −47.202 | 201.190 |
| 9.0 | −177.552 | −20.112 | 196.899 |
| 9.0 | −178.394 | 7.116 | 192.587 |
| 9.0 | −176.508 | 34.254 | 188.289 |
| 9.0 | −165.608 | 59.090 | 184.355 |
| 9.0 | −147.295 | 79.419 | 181.135 |
| 9.0 | −126.705 | 97.533 | 178.266 |
| 9.0 | −104.243 | 113.323 | 175.765 |
| 9.0 | −80.038 | 126.357 | 173.701 |
| 9.0 | −54.326 | 136.171 | 172.147 |
| 9.0 | −27.476 | 142.315 | 171.173 |
| 10.0 | 0.000 | 137.813 | 191.359 |
| 10.0 | 27.411 | 135.748 | 191.723 |
| 10.0 | 54.217 | 129.733 | 192.783 |
| 10.0 | 79.932 | 120.143 | 194.474 |
| 10.0 | 104.216 | 107.434 | 196.715 |

TABLE 1-continued

| θ | X | Y | Z |
|---|---|---|---|
| 10.0 | 126.863 | 92.065 | 199.425 |
| 10.0 | 147.770 | 74.463 | 202.529 |
| 10.0 | 166.512 | 54.675 | 206.018 |
| 10.0 | 177.490 | 30.042 | 210.362 |
| 10.0 | 178.983 | 3.031 | 215.124 |
| 10.0 | 177.868 | −24.041 | 219.898 |
| 10.0 | 174.883 | −50.974 | 224.647 |
| 10.0 | 170.025 | −77.642 | 229.349 |
| 10.0 | 163.264 | −103.904 | 233.980 |
| 10.0 | 150.655 | −127.815 | 238.196 |
| 10.0 | 130.213 | −145.740 | 241.357 |
| 10.0 | 106.213 | −158.965 | 243.689 |
| 10.0 | 80.849 | −169.438 | 245.535 |
| 10.0 | 54.457 | −177.055 | 246.878 |
| 10.0 | 27.363 | −181.705 | 247.698 |
| 10.0 | −0.092 | −183.273 | 247.975 |
| 10.0 | −27.537 | −181.685 | 247.695 |
| 10.0 | −54.619 | −177.018 | 246.872 |
| 10.0 | −80.997 | −169.386 | 245.526 |
| 10.0 | −106.346 | −158.902 | 243.677 |
| 10.0 | −130.330 | −145.666 | 241.344 |
| 10.0 | −150.734 | −127.715 | 238.178 |
| 10.0 | −163.298 | −103.791 | 233.960 |
| 10.0 | −170.049 | −77.535 | 229.330 |
| 10.0 | −174.898 | −50.875 | 224.630 |
| 10.0 | −177.875 | −23.950 | 219.882 |
| 10.0 | −178.983 | 3.113 | 215.110 |
| 10.0 | −177.475 | 30.114 | 210.349 |
| 10.0 | −166.474 | 54.727 | 206.009 |
| 10.0 | −147.729 | 74.500 | 202.522 |
| 10.0 | −126.826 | 92.093 | 199.420 |
| 10.0 | −104.184 | 107.453 | 196.712 |
| 10.0 | −79.906 | 120.154 | 194.472 |
| 10.0 | −54.199 | 129.738 | 192.783 |
| 10.0 | −27.401 | 135.750 | 191.723 |
| 11.0 | 0.000 | 130.673 | 212.339 |
| 11.0 | 27.316 | 128.661 | 212.730 |
| 11.0 | 54.054 | 122.807 | 213.868 |
| 11.0 | 79.756 | 113.488 | 215.679 |
| 11.0 | 104.111 | 101.160 | 218.076 |
| 11.0 | 126.938 | 86.273 | 220.969 |
| 11.0 | 148.158 | 69.246 | 224.279 |
| 11.0 | 167.330 | 50.064 | 228.008 |
| 11.0 | 178.412 | 25.687 | 232.746 |
| 11.0 | 179.535 | −1.154 | 237.964 |
| 11.0 | 178.158 | −28.030 | 243.188 |
| 11.0 | 175.078 | −54.769 | 248.385 |
| 11.0 | 170.288 | −81.265 | 253.535 |
| 11.0 | 163.759 | −107.400 | 258.616 |
| 11.0 | 151.318 | −131.190 | 263.240 |
| 11.0 | 130.642 | −148.612 | 266.626 |
| 11.0 | 106.337 | −161.040 | 269.042 |
| 11.0 | 80.820 | −170.852 | 270.949 |
| 11.0 | 54.393 | −177.977 | 272.334 |
| 11.0 | 27.348 | −182.324 | 273.179 |
| 11.0 | −0.015 | −183.796 | 273.466 |
| 11.0 | −27.376 | −182.321 | 273.179 |
| 11.0 | −54.419 | −177.971 | 272.333 |
| 11.0 | −80.844 | −170.844 | 270.948 |
| 11.0 | −106.358 | −161.030 | 269.040 |
| 11.0 | −130.661 | −148.601 | 266.624 |
| 11.0 | −151.331 | −131.174 | 263.237 |
| 11.0 | −163.764 | −107.381 | 258.612 |
| 11.0 | −170.292 | −81.248 | 253.532 |
| 11.0 | −175.081 | −54.753 | 248.382 |
| 11.0 | −178.160 | −28.015 | 243.185 |
| 11.0 | −179.535 | −1.141 | 237.961 |
| 11.0 | −178.409 | 25.699 | 232.744 |
| 11.0 | −167.324 | 50.072 | 228.006 |
| 11.0 | −148.152 | 69.252 | 224.278 |
| 11.0 | −126.932 | 86.278 | 220.969 |
| 11.0 | −104.106 | 101.163 | 218.075 |
| 11.0 | −79.752 | 113.490 | 215.679 |
| 11.0 | −54.052 | 122.808 | 213.868 |
| 11.0 | −27.314 | 128.661 | 212.730 |
| 12.0 | 0.000 | 123.058 | 233.813 |
| 12.0 | 27.202 | 121.110 | 234.227 |

TABLE 1-continued

| θ | X | Y | Z |
|---|---|---|---|
| 12.0 | 53.858 | 115.448 | 235.431 |
| 12.0 | 79.540 | 106.445 | 237.344 |
| 12.0 | 103.962 | 94.546 | 239.873 |
| 12.0 | 126.970 | 80.196 | 242.924 |
| 12.0 | 148.504 | 63.798 | 246.409 |
| 12.0 | 168.101 | 45.274 | 250.347 |
| 12.0 | 179.284 | 21.184 | 255.467 |
| 12.0 | 180.044 | −5.454 | 261.129 |
| 12.0 | 178.408 | −32.105 | 266.794 |
| 12.0 | 175.227 | −58.621 | 272.430 |
| 12.0 | 170.491 | −84.914 | 278.019 |
| 12.0 | 164.169 | −110.887 | 283.540 |
| 12.0 | 151.849 | −134.502 | 288.559 |
| 12.0 | 130.915 | −151.344 | 292.139 |
| 12.0 | 106.319 | −162.901 | 294.596 |
| 12.0 | 80.666 | −172.000 | 296.530 |
| 12.0 | 54.224 | −178.591 | 297.931 |
| 12.0 | 27.247 | −182.610 | 298.785 |
| 12.0 | −0.004 | −183.972 | 299.074 |
| 12.0 | −27.255 | −182.609 | 298.785 |
| 12.0 | −54.231 | −178.590 | 297.930 |
| 12.0 | −80.673 | −171.998 | 296.529 |
| 12.0 | −106.325 | −162.899 | 294.595 |
| 12.0 | −130.921 | −151.342 | 292.139 |
| 12.0 | −151.852 | −134.497 | 288.558 |
| 12.0 | −164.170 | −110.881 | 283.538 |
| 12.0 | −170.492 | −84.910 | 278.018 |
| 12.0 | −175.228 | −58.617 | 272.429 |
| 12.0 | −178.409 | −32.101 | 266.793 |
| 12.0 | −180.045 | −5.451 | 261.128 |
| 12.0 | −179.284 | 21.187 | 255.466 |
| 12.0 | −168.099 | 45.276 | 250.346 |
| 12.0 | −148.502 | 63.800 | 246.409 |
| 12.0 | −126.968 | 80.197 | 242.923 |
| 12.0 | −103.961 | 94.547 | 239.873 |
| 12.0 | −79.538 | 106.445 | 237.344 |
| 12.0 | −53.857 | 115.448 | 235.431 |
| 12.0 | −27.201 | 121.110 | 234.227 |
| 13.0 | 0.000 | 115.033 | 255.809 |
| 13.0 | 27.065 | 113.161 | 256.241 |
| 13.0 | 53.621 | 107.722 | 257.496 |
| 13.0 | 79.271 | 99.081 | 259.491 |
| 13.0 | 103.757 | 87.669 | 262.126 |
| 13.0 | 126.943 | 73.915 | 265.302 |
| 13.0 | 148.788 | 58.209 | 268.928 |
| 13.0 | 168.808 | 40.403 | 273.038 |
| 13.0 | 180.100 | 16.637 | 278.525 |
| 13.0 | 180.507 | −9.763 | 284.620 |
| 13.0 | 178.616 | −36.156 | 290.713 |
| 13.0 | 175.330 | −62.418 | 296.777 |
| 13.0 | 170.636 | −88.476 | 302.793 |
| 13.0 | 164.504 | −114.249 | 308.743 |
| 13.0 | 152.262 | −137.635 | 314.142 |
| 13.0 | 131.058 | −153.820 | 317.878 |
| 13.0 | 106.197 | −164.441 | 320.330 |
| 13.0 | 80.434 | −172.778 | 322.255 |
| 13.0 | 54.002 | −178.807 | 323.647 |
| 13.0 | 27.119 | −182.479 | 324.495 |
| 13.0 | 0.003 | −183.724 | 324.782 |
| 13.0 | −27.113 | −182.480 | 324.495 |
| 13.0 | −53.997 | −178.808 | 323.647 |
| 13.0 | −80.429 | −172.780 | 322.255 |
| 13.0 | −106.192 | −164.443 | 320.331 |
| 13.0 | −131.054 | −153.822 | 317.879 |
| 13.0 | −152.259 | −137.638 | 314.142 |
| 13.0 | −164.503 | −114.253 | 308.744 |
| 13.0 | −170.636 | −88.480 | 302.793 |
| 13.0 | −175.329 | −62.421 | 296.777 |
| 13.0 | −178.616 | −36.159 | 290.714 |
| 13.0 | −180.507 | −9.766 | 284.621 |
| 13.0 | −180.100 | 16.634 | 278.526 |
| 13.0 | −168.809 | 40.402 | 273.039 |
| 13.0 | −148.789 | 58.208 | 268.928 |
| 13.0 | −126.945 | 73.914 | 265.302 |
| 13.0 | −103.758 | 87.668 | 262.126 |
| 13.0 | −79.272 | 99.081 | 259.492 |
| 13.0 | −53.622 | 107.722 | 257.497 |

TABLE 1-continued

| θ | X | Y | Z |
|---|---|---|---|
| 13.0 | −27.066 | 113.161 | 256.241 |
| 14.0 | 0.000 | 106.673 | 278.347 |
| 14.0 | 26.906 | 104.889 | 278.792 |
| 14.0 | 53.343 | 99.707 | 280.084 |
| 14.0 | 78.949 | 91.476 | 282.136 |
| 14.0 | 103.493 | 80.610 | 284.845 |
| 14.0 | 126.856 | 67.516 | 288.110 |
| 14.0 | 149.007 | 52.566 | 291.837 |
| 14.0 | 169.444 | 35.543 | 296.082 |
| 14.0 | 180.854 | 12.138 | 301.917 |
| 14.0 | 180.918 | −13.989 | 308.431 |
| 14.0 | 178.777 | −40.092 | 314.940 |
| 14.0 | 175.385 | −66.069 | 321.417 |
| 14.0 | 170.724 | −91.861 | 327.847 |
| 14.0 | 164.764 | −117.399 | 334.215 |
| 14.0 | 152.549 | −140.497 | 339.973 |
| 14.0 | 131.059 | −155.938 | 343.823 |
| 14.0 | 105.968 | −165.564 | 346.223 |
| 14.0 | 80.128 | −173.099 | 348.102 |
| 14.0 | 53.735 | −178.538 | 349.458 |
| 14.0 | 26.970 | −181.849 | 350.284 |
| 14.0 | 0.014 | −182.972 | 350.564 |
| 14.0 | −26.944 | −181.852 | 350.284 |
| 14.0 | −53.711 | −178.542 | 349.459 |
| 14.0 | −80.105 | −173.105 | 348.103 |
| 14.0 | −105.947 | −165.571 | 346.225 |
| 14.0 | −131.040 | −155.946 | 343.825 |
| 14.0 | −152.537 | −140.511 | 339.977 |
| 14.0 | −164.760 | −117.416 | 334.219 |
| 14.0 | −170.721 | −91.877 | 327.851 |
| 14.0 | −175.382 | −66.084 | 321.420 |
| 14.0 | −178.776 | −40.105 | 314.943 |
| 14.0 | −180.917 | −14.001 | 308.434 |
| 14.0 | −180.856 | 12.128 | 301.920 |
| 14.0 | −169.451 | 35.535 | 296.084 |
| 14.0 | −149.013 | 52.561 | 291.839 |
| 14.0 | −126.861 | 67.512 | 288.111 |
| 14.0 | −103.498 | 80.608 | 284.846 |
| 14.0 | −78.953 | 91.475 | 282.136 |
| 14.0 | −53.346 | 99.706 | 280.084 |
| 14.0 | −26.907 | 104.889 | 278.792 |
| 15.0 | 0.000 | 98.073 | 301.440 |
| 15.0 | 26.727 | 96.389 | 301.891 |
| 15.0 | 53.030 | 91.498 | 303.202 |
| 15.0 | 78.583 | 83.728 | 305.284 |
| 15.0 | 103.178 | 73.464 | 308.034 |
| 15.0 | 126.713 | 61.092 | 311.349 |
| 15.0 | 149.165 | 46.964 | 315.135 |
| 15.0 | 170.015 | 30.785 | 319.470 |
| 15.0 | 181.546 | 7.778 | 325.634 |
| 15.0 | 181.274 | −18.047 | 332.554 |
| 15.0 | 178.888 | −43.831 | 339.463 |
| 15.0 | 175.386 | −69.497 | 346.340 |
| 15.0 | 170.748 | −94.993 | 353.172 |
| 15.0 | 164.944 | −120.266 | 359.944 |
| 15.0 | 152.685 | −143.010 | 366.038 |
| 15.0 | 130.882 | −157.601 | 369.948 |
| 15.0 | 105.601 | −166.178 | 372.246 |
| 15.0 | 79.718 | −172.877 | 374.041 |
| 15.0 | 53.392 | −177.706 | 375.335 |
| 15.0 | 26.769 | −180.643 | 376.122 |
| 15.0 | −0.007 | −181.638 | 376.388 |
| 15.0 | −26.783 | −180.642 | 376.121 |
| 15.0 | −53.405 | −177.704 | 375.334 |
| 15.0 | −79.730 | −172.875 | 374.040 |
| 15.0 | −105.612 | −166.175 | 372.245 |
| 15.0 | −130.893 | −157.597 | 369.947 |
| 15.0 | −152.691 | −143.002 | 366.036 |
| 15.0 | −164.947 | −120.257 | 359.941 |
| 15.0 | −170.750 | −94.985 | 353.170 |
| 15.0 | −175.387 | −69.489 | 346.338 |
| 15.0 | −178.889 | −43.824 | 339.461 |
| 15.0 | −181.274 | −18.040 | 332.552 |
| 15.0 | −181.545 | 7.783 | 325.633 |
| 15.0 | −170.011 | 30.789 | 319.469 |
| 15.0 | −149.161 | 46.966 | 315.134 |
| 15.0 | −126.710 | 61.094 | 311.348 |

TABLE 1-continued

| θ | X | Y | Z |
|---|---|---|---|
| 15.0 | −103.175 | 73.465 | 308.034 |
| 15.0 | −78.581 | 83.729 | 305.283 |
| 15.0 | −53.029 | 91.498 | 303.202 |
| 15.0 | −26.726 | 96.389 | 301.891 |
| 16.0 | 0.000 | 89.350 | 325.087 |
| 16.0 | 26.527 | 87.779 | 325.537 |
| 16.0 | 52.678 | 83.212 | 326.847 |
| 16.0 | 78.164 | 75.951 | 328.929 |
| 16.0 | 102.801 | 66.349 | 331.682 |
| 16.0 | 126.499 | 54.765 | 335.004 |
| 16.0 | 149.241 | 41.524 | 338.801 |
| 16.0 | 170.495 | 26.260 | 343.178 |
| 16.0 | 182.169 | 3.691 | 349.649 |
| 16.0 | 181.577 | −21.799 | 356.958 |
| 16.0 | 178.953 | −47.236 | 364.252 |
| 16.0 | 175.341 | −72.561 | 371.514 |
| 16.0 | 170.719 | −97.734 | 378.732 |
| 16.0 | 165.058 | −122.709 | 385.894 |
| 16.0 | 152.692 | −145.038 | 392.296 |
| 16.0 | 130.571 | −158.684 | 396.209 |
| 16.0 | 105.152 | −166.180 | 398.359 |
| 16.0 | 79.268 | −172.027 | 400.035 |
| 16.0 | 53.043 | −176.239 | 401.243 |
| 16.0 | 26.588 | −178.801 | 401.978 |
| 16.0 | 0.015 | −179.671 | 402.227 |
| 16.0 | −26.560 | −178.803 | 401.978 |
| 16.0 | −53.017 | −176.242 | 401.244 |
| 16.0 | −79.244 | −172.031 | 400.037 |
| 16.0 | −105.129 | −166.186 | 398.360 |
| 16.0 | −130.550 | −158.691 | 396.211 |
| 16.0 | −152.678 | −145.053 | 392.301 |
| 16.0 | −165.054 | −122.727 | 385.899 |
| 16.0 | −170.716 | −97.750 | 378.737 |
| 16.0 | −175.339 | −72.576 | 371.518 |
| 16.0 | −178.951 | −47.250 | 364.256 |
| 16.0 | −181.576 | −21.811 | 356.962 |
| 16.0 | −182.171 | 3.680 | 349.652 |
| 16.0 | −170.502 | 26.252 | 343.180 |
| 16.0 | −149.249 | 41.519 | 338.802 |
| 16.0 | −126.505 | 54.761 | 335.005 |
| 16.0 | −102.806 | 66.347 | 331.683 |
| 16.0 | −78.168 | 75.949 | 328.929 |
| 16.0 | −52.681 | 83.211 | 326.847 |
| 16.0 | −26.528 | 87.778 | 325.537 |
| 17.0 | 0.000 | 80.644 | 349.272 |
| 17.0 | 26.315 | 79.194 | 349.715 |
| 17.0 | 52.304 | 74.978 | 351.005 |
| 17.0 | 77.715 | 68.265 | 353.057 |
| 17.0 | 102.386 | 59.374 | 355.775 |
| 17.0 | 126.239 | 48.628 | 359.060 |
| 17.0 | 149.257 | 36.329 | 362.821 |
| 17.0 | 170.903 | 22.033 | 367.191 |
| 17.0 | 182.731 | −0.066 | 373.948 |
| 17.0 | 181.827 | −25.201 | 381.632 |
| 17.0 | 178.971 | −50.272 | 389.297 |
| 17.0 | 175.247 | −75.239 | 396.930 |
| 17.0 | 170.633 | −100.069 | 404.522 |
| 17.0 | 165.096 | −124.726 | 412.060 |
| 17.0 | 152.526 | −146.567 | 418.738 |
| 17.0 | 130.064 | −159.152 | 422.585 |
| 17.0 | 104.559 | −165.553 | 424.542 |
| 17.0 | 78.711 | −170.545 | 426.068 |
| 17.0 | 52.611 | −174.140 | 427.168 |
| 17.0 | 26.342 | −176.329 | 427.837 |
| 17.0 | −0.016 | −177.072 | 428.064 |
| 17.0 | −26.372 | −176.328 | 427.836 |
| 17.0 | −52.640 | −174.137 | 427.167 |
| 17.0 | −78.738 | −170.540 | 426.067 |
| 17.0 | −104.584 | −165.548 | 424.541 |
| 17.0 | −130.087 | −159.145 | 422.583 |
| 17.0 | −152.542 | −146.552 | 418.733 |
| 17.0 | −165.101 | −124.707 | 412.054 |
| 17.0 | −170.636 | −100.051 | 404.516 |
| 17.0 | −175.250 | −75.222 | 396.925 |
| 17.0 | −178.973 | −50.257 | 389.293 |
| 17.0 | −181.828 | −25.188 | 381.628 |
| 17.0 | −182.728 | −0.054 | 373.944 |

TABLE 1-continued

| θ | X | Y | Z |
|---|---|---|---|
| 17.0 | −170.895 | 22.041 | 367.189 |
| 17.0 | −149.249 | 36.333 | 362.819 |
| 17.0 | −126.231 | 48.632 | 359.059 |
| 17.0 | −102.380 | 59.376 | 355.775 |
| 17.0 | −77.710 | 68.266 | 353.057 |
| 17.0 | −52.301 | 74.979 | 351.004 |
| 17.0 | −26.313 | 79.195 | 349.715 |
| 18.0 | 0.000 | 72.113 | 373.966 |
| 18.0 | 26.093 | 70.792 | 374.395 |
| 18.0 | 51.909 | 66.946 | 375.645 |
| 18.0 | 77.233 | 60.812 | 377.638 |
| 18.0 | 101.926 | 52.669 | 380.284 |
| 18.0 | 125.916 | 42.805 | 383.489 |
| 18.0 | 149.189 | 31.490 | 387.165 |
| 18.0 | 171.210 | 18.217 | 391.478 |
| 18.0 | 183.227 | −3.374 | 398.493 |
| 18.0 | 182.034 | −28.136 | 406.539 |
| 18.0 | 178.954 | −52.824 | 414.560 |
| 18.0 | 175.121 | −77.416 | 422.551 |
| 18.0 | 170.509 | −101.887 | 430.502 |
| 18.0 | 165.081 | −126.206 | 438.404 |
| 18.0 | 152.240 | −147.502 | 445.323 |
| 18.0 | 129.446 | −158.944 | 449.041 |
| 18.0 | 103.912 | −164.260 | 450.768 |
| 18.0 | 78.140 | −168.410 | 452.117 |
| 18.0 | 52.191 | −171.404 | 453.090 |
| 18.0 | 26.122 | −173.230 | 453.683 |
| 18.0 | −0.009 | −173.850 | 453.884 |
| 18.0 | −26.139 | −173.229 | 453.682 |
| 18.0 | −52.206 | −171.403 | 453.089 |
| 18.0 | −78.154 | −168.408 | 452.116 |
| 18.0 | −103.926 | −164.258 | 450.768 |
| 18.0 | −129.459 | −158.941 | 449.040 |
| 18.0 | −152.248 | −147.494 | 445.321 |
| 18.0 | −165.084 | −126.196 | 438.401 |
| 18.0 | −170.511 | −101.878 | 430.499 |
| 18.0 | −175.122 | −77.407 | 422.548 |
| 18.0 | −178.955 | −52.816 | 414.558 |
| 18.0 | −182.035 | −28.128 | 406.536 |
| 18.0 | −183.226 | −3.368 | 398.491 |
| 18.0 | −171.205 | 18.221 | 391.477 |
| 18.0 | −149.185 | 31.492 | 387.164 |
| 18.0 | −125.912 | 42.807 | 383.488 |
| 18.0 | −101.922 | 52.670 | 380.283 |
| 18.0 | −77.231 | 60.813 | 377.638 |
| 18.0 | −51.907 | 66.947 | 375.645 |
| 18.0 | −26.092 | 70.793 | 374.395 |
| 19.0 | 0.000 | 63.932 | 399.121 |
| 19.0 | 25.867 | 62.743 | 399.530 |
| 19.0 | 51.506 | 59.278 | 400.723 |
| 19.0 | 76.735 | 53.739 | 402.630 |
| 19.0 | 101.435 | 46.365 | 405.169 |
| 19.0 | 125.544 | 37.408 | 408.254 |
| 19.0 | 149.044 | 27.104 | 411.802 |
| 19.0 | 171.419 | 14.892 | 416.006 |
| 19.0 | 183.664 | −6.157 | 423.254 |
| 19.0 | 182.207 | −30.535 | 431.648 |
| 19.0 | 178.912 | −54.831 | 440.014 |
| 19.0 | 174.970 | −79.042 | 448.350 |
| 19.0 | 170.355 | −103.145 | 456.650 |
| 19.0 | 165.016 | −127.114 | 464.903 |
| 19.0 | 151.832 | −147.809 | 472.029 |
| 19.0 | 128.722 | −158.036 | 475.550 |
| 19.0 | 103.210 | −162.294 | 477.016 |
| 19.0 | 77.545 | −165.627 | 478.164 |
| 19.0 | 51.765 | −168.038 | 478.994 |
| 19.0 | 25.905 | −169.513 | 479.502 |
| 19.0 | 0.005 | −170.016 | 479.675 |
| 19.0 | −25.896 | −169.513 | 479.502 |
| 19.0 | −51.756 | −168.039 | 478.994 |
| 19.0 | −77.537 | −165.628 | 478.164 |
| 19.0 | −103.202 | −162.295 | 477.017 |
| 19.0 | −128.715 | −158.037 | 475.551 |
| 19.0 | −151.826 | −147.813 | 472.030 |
| 19.0 | −165.015 | −127.120 | 464.905 |
| 19.0 | −170.354 | −103.151 | 456.652 |
| 19.0 | −174.969 | −79.047 | 448.352 |

TABLE 1-continued

| θ | X | Y | Z |
|---|---|---|---|
| 19.0 | −178.911 | −54.836 | 440.016 |
| 19.0 | −182.207 | −30.539 | 431.649 |
| 19.0 | −183.665 | −6.161 | 423.256 |
| 19.0 | −171.421 | 14.890 | 416.007 |
| 19.0 | −149.047 | 27.102 | 411.802 |
| 19.0 | −125.546 | 37.407 | 408.254 |
| 19.0 | −101.437 | 46.365 | 405.169 |
| 19.0 | −76.736 | 53.738 | 402.630 |
| 19.0 | −51.507 | 59.278 | 400.723 |
| 19.0 | −25.868 | 62.743 | 399.530 |
| 20.0 | 0.000 | 56.281 | 424.673 |
| 20.0 | 25.646 | 55.225 | 425.058 |
| 20.0 | 51.107 | 52.141 | 426.180 |
| 20.0 | 76.235 | 47.199 | 427.979 |
| 20.0 | 100.930 | 40.599 | 430.381 |
| 20.0 | 125.135 | 32.553 | 433.310 |
| 20.0 | 148.833 | 23.265 | 436.690 |
| 20.0 | 171.534 | 12.136 | 440.741 |
| 20.0 | 184.048 | −8.343 | 448.195 |
| 20.0 | 182.353 | −32.334 | 456.927 |
| 20.0 | 178.851 | −56.238 | 465.627 |
| 20.0 | 174.802 | −80.066 | 474.300 |
| 20.0 | 170.180 | −103.802 | 482.939 |
| 20.0 | 164.906 | −127.415 | 491.534 |
| 20.0 | 151.301 | −147.452 | 498.826 |
| 20.0 | 127.896 | −156.405 | 502.085 |
| 20.0 | 102.451 | −159.646 | 503.265 |
| 20.0 | 76.917 | −162.197 | 504.193 |
| 20.0 | 51.315 | −164.051 | 504.868 |
| 20.0 | 25.665 | −165.190 | 505.283 |
| 20.0 | −0.009 | −165.580 | 505.425 |
| 20.0 | −25.682 | −165.190 | 505.282 |
| 20.0 | −51.331 | −164.050 | 504.868 |
| 20.0 | −76.932 | −162.195 | 504.192 |
| 20.0 | −102.465 | −159.644 | 503.264 |
| 20.0 | −127.909 | −156.403 | 502.084 |
| 20.0 | −151.311 | −147.444 | 498.823 |
| 20.0 | −164.909 | −127.405 | 491.530 |
| 20.0 | −170.182 | −103.792 | 482.935 |
| 20.0 | −174.804 | −80.057 | 474.297 |
| 20.0 | −178.852 | −56.230 | 465.624 |
| 20.0 | −182.354 | −32.326 | 456.924 |
| 20.0 | −184.046 | −8.337 | 448.192 |
| 20.0 | −171.529 | 12.140 | 440.740 |
| 20.0 | −148.828 | 23.267 | 436.690 |
| 20.0 | −125.131 | 32.554 | 433.309 |
| 20.0 | −100.927 | 40.600 | 430.381 |
| 20.0 | −76.233 | 47.199 | 427.979 |
| 20.0 | −51.105 | 52.141 | 426.180 |
| 20.0 | −25.645 | 55.225 | 425.058 |
| 21.0 | 0.000 | 49.344 | 450.548 |
| 21.0 | 25.439 | 48.416 | 450.904 |
| 21.0 | 50.731 | 45.704 | 451.946 |
| 21.0 | 75.759 | 41.344 | 453.619 |
| 21.0 | 100.439 | 35.502 | 455.861 |
| 21.0 | 124.720 | 28.351 | 458.606 |
| 21.0 | 148.584 | 20.062 | 461.788 |
| 21.0 | 171.580 | 10.011 | 465.647 |
| 21.0 | 184.387 | −9.886 | 473.285 |
| 21.0 | 182.474 | −33.498 | 482.348 |
| 21.0 | 178.774 | −57.018 | 491.377 |
| 21.0 | 174.619 | −80.473 | 500.380 |
| 21.0 | 169.984 | −103.848 | 509.353 |
| 21.0 | 164.741 | −127.108 | 518.282 |
| 21.0 | 150.617 | −146.420 | 525.695 |
| 21.0 | 126.933 | −154.035 | 528.618 |
| 21.0 | 101.586 | −156.315 | 529.493 |
| 21.0 | 76.196 | −158.126 | 530.188 |
| 21.0 | 50.772 | −159.453 | 530.698 |
| 21.0 | 25.323 | −160.273 | 531.013 |
| 21.0 | −0.139 | −160.554 | 531.120 |
| 21.0 | −25.587 | −160.267 | 531.010 |
| 21.0 | −51.022 | −159.442 | 530.694 |
| 21.0 | −76.432 | −158.111 | 530.183 |
| 21.0 | −101.808 | −156.297 | 529.487 |
| 21.0 | −127.140 | −154.015 | 528.610 |
| 21.0 | −150.771 | −146.309 | 525.652 |

TABLE 1-continued

| θ | X | Y | Z |
|---|---|---|---|
| 21.0 | −164.791 | −126.946 | 518.220 |
| 21.0 | −170.016 | −103.695 | 509.294 |
| 21.0 | −174.646 | −80.332 | 500.326 |
| 21.0 | −178.796 | −56.890 | 491.328 |
| 21.0 | −182.491 | −33.382 | 482.304 |
| 21.0 | −184.369 | −9.784 | 473.245 |
| 21.0 | −171.502 | 10.066 | 465.626 |
| 21.0 | −148.507 | 20.091 | 461.777 |
| 21.0 | −124.655 | 28.373 | 458.598 |
| 21.0 | −100.385 | 35.517 | 455.856 |
| 21.0 | −75.718 | 41.353 | 453.616 |
| 21.0 | −50.704 | 45.707 | 451.944 |
| 21.0 | −25.425 | 48.417 | 450.904 |
| 22.0 | 0.000 | 43.290 | 476.659 |
| 22.0 | 25.228 | 42.484 | 476.984 |
| 22.0 | 50.344 | 40.132 | 477.935 |
| 22.0 | 75.254 | 36.335 | 479.469 |
| 22.0 | 99.890 | 31.227 | 481.533 |
| 22.0 | 124.209 | 24.945 | 484.071 |
| 22.0 | 148.190 | 17.628 | 487.027 |
| 22.0 | 171.442 | 8.669 | 490.647 |
| 22.0 | 184.658 | −10.564 | 498.417 |
| 22.0 | 182.606 | −33.789 | 507.801 |
| 22.0 | 178.724 | −56.920 | 517.146 |
| 22.0 | 174.472 | −79.995 | 526.469 |
| 22.0 | 169.825 | −103.004 | 535.766 |
| 22.0 | 164.606 | −125.903 | 545.017 |
| 22.0 | 150.034 | −144.507 | 552.534 |
| 22.0 | 126.175 | −150.888 | 555.112 |
| 22.0 | 100.972 | −152.276 | 555.673 |
| 22.0 | 75.753 | −153.400 | 556.127 |
| 22.0 | 50.522 | −154.237 | 556.465 |
| 22.0 | 25.280 | −154.764 | 556.678 |
| 22.0 | 0.033 | −154.948 | 556.752 |
| 22.0 | −25.217 | −154.765 | 556.678 |
| 22.0 | −50.462 | −154.239 | 556.466 |
| 22.0 | −75.697 | −153.402 | 556.128 |
| 22.0 | −100.919 | −152.279 | 555.674 |
| 22.0 | −126.125 | −150.891 | 555.113 |
| 22.0 | −149.996 | −144.532 | 552.544 |
| 22.0 | −164.593 | −125.941 | 545.033 |
| 22.0 | −169.817 | −103.041 | 535.780 |
| 22.0 | −174.465 | −80.028 | 526.483 |
| 22.0 | −178.719 | −56.951 | 517.159 |
| 22.0 | −182.602 | −33.817 | 507.812 |
| 22.0 | −184.663 | −10.588 | 498.427 |
| 22.0 | −171.462 | 8.657 | 490.652 |
| 22.0 | −148.209 | 17.622 | 487.029 |
| 22.0 | −124.225 | 24.941 | 484.073 |
| 22.0 | −99.903 | 31.224 | 481.534 |
| 22.0 | −75.263 | 36.333 | 479.470 |
| 22.0 | −50.350 | 40.131 | 477.935 |
| 22.0 | −25.231 | 42.484 | 476.985 |
| 23.0 | 0.000 | 38.273 | 502.913 |
| 23.0 | 25.043 | 37.583 | 503.206 |
| 23.0 | 50.000 | 35.560 | 504.065 |
| 23.0 | 74.801 | 32.287 | 505.454 |
| 23.0 | 99.391 | 27.863 | 507.332 |
| 23.0 | 123.732 | 22.396 | 509.653 |
| 23.0 | 147.803 | 15.993 | 512.370 |
| 23.0 | 171.271 | 8.072 | 515.733 |
| 23.0 | 184.899 | −10.505 | 523.618 |
| 23.0 | 182.725 | −33.364 | 533.321 |
| 23.0 | 178.668 | −56.125 | 542.983 |
| 23.0 | 174.319 | −78.840 | 552.625 |
| 23.0 | 169.654 | −101.502 | 562.244 |
| 23.0 | 164.415 | −124.049 | 571.815 |
| 23.0 | 149.294 | −141.880 | 579.383 |
| 23.0 | 125.275 | −146.993 | 581.554 |
| 23.0 | 100.226 | −147.561 | 581.795 |
| 23.0 | 75.174 | −148.049 | 582.002 |
| 23.0 | 50.120 | −148.432 | 582.165 |
| 23.0 | 25.064 | −148.684 | 582.272 |
| 23.0 | 0.007 | −148.776 | 582.311 |
| 23.0 | −25.051 | −148.684 | 582.272 |
| 23.0 | −50.108 | −148.432 | 582.165 |
| 23.0 | −75.163 | −148.049 | 582.002 |

TABLE 1-continued

| θ | X | Y | Z |
|---|---|---|---|
| 23.0 | −100.215 | −147.561 | 581.795 |
| 23.0 | −125.266 | −146.993 | 581.554 |
| 23.0 | −149.286 | −141.884 | 579.385 |
| 23.0 | −164.413 | −124.056 | 571.818 |
| 23.0 | −169.652 | −101.509 | 562.247 |
| 23.0 | −174.318 | −78.847 | 552.627 |
| 23.0 | −178.667 | −56.131 | 542.985 |
| 23.0 | −182.724 | −33.369 | 533.323 |
| 23.0 | −184.900 | −10.510 | 523.620 |
| 23.0 | −171.275 | 8.070 | 515.734 |
| 23.0 | −147.807 | 15.992 | 512.371 |
| 23.0 | −123.735 | 22.395 | 509.653 |
| 23.0 | −99.393 | 27.863 | 507.332 |
| 23.0 | −74.803 | 32.287 | 505.454 |
| 23.0 | −50.001 | 35.560 | 504.065 |
| 23.0 | −25.043 | 37.583 | 503.206 |
| 24.0 | 0.000 | 34.418 | 529.218 |
| 24.0 | 24.872 | 33.833 | 529.479 |
| 24.0 | 49.682 | 32.112 | 530.245 |
| 24.0 | 74.374 | 29.318 | 531.489 |
| 24.0 | 98.907 | 25.523 | 533.179 |
| 24.0 | 123.247 | 20.806 | 535.279 |
| 24.0 | 147.374 | 15.248 | 537.753 |
| 24.0 | 171.015 | 8.313 | 540.841 |
| 24.0 | 185.096 | −9.582 | 548.809 |
| 24.0 | 182.848 | −32.085 | 558.827 |
| 24.0 | 178.630 | −54.488 | 568.802 |
| 24.0 | 174.188 | −76.855 | 578.760 |
| 24.0 | 169.502 | −99.180 | 588.700 |
| 24.0 | 164.219 | −121.379 | 598.584 |
| 24.0 | 148.545 | −138.423 | 606.172 |
| 24.0 | 124.426 | −142.337 | 607.915 |
| 24.0 | 99.543 | −142.163 | 607.838 |
| 24.0 | 74.660 | −142.073 | 607.797 |
| 24.0 | 49.777 | −142.041 | 607.783 |
| 24.0 | 24.893 | −142.041 | 607.783 |
| 24.0 | 0.010 | −142.047 | 607.786 |
| 24.0 | −24.874 | −142.041 | 607.783 |
| 24.0 | −49.759 | −142.041 | 607.783 |
| 24.0 | −74.643 | −142.073 | 607.797 |
| 24.0 | −99.527 | −142.163 | 607.837 |
| 24.0 | −124.411 | −142.337 | 607.915 |
| 24.0 | −148.533 | −138.429 | 606.175 |
| 24.0 | −164.214 | −121.391 | 598.589 |
| 24.0 | −169.500 | −99.191 | 588.705 |
| 24.0 | −174.186 | −76.865 | 578.765 |
| 24.0 | −178.628 | −54.497 | 568.806 |
| 24.0 | −182.846 | −32.093 | 558.831 |
| 24.0 | −185.097 | −9.589 | 548.812 |
| 24.0 | −171.021 | 8.310 | 540.843 |
| 24.0 | −147.380 | 15.247 | 537.754 |
| 24.0 | −123.252 | 20.805 | 535.279 |
| 24.0 | −98.911 | 25.522 | 533.179 |
| 24.0 | −74.377 | 29.317 | 531.489 |
| 24.0 | −49.684 | 32.112 | 530.245 |
| 24.0 | −24.873 | 33.833 | 529.479 |
| 25.0 | 0.000 | 31.869 | 555.462 |
| 25.0 | 24.723 | 31.378 | 555.692 |
| 25.0 | 49.401 | 29.927 | 556.368 |
| 25.0 | 73.992 | 27.561 | 557.472 |
| 25.0 | 98.463 | 24.330 | 558.978 |
| 25.0 | 122.788 | 20.289 | 560.862 |
| 25.0 | 146.945 | 15.494 | 563.098 |
| 25.0 | 170.717 | 9.463 | 565.910 |
| 25.0 | 185.258 | −7.751 | 573.938 |
| 25.0 | 182.974 | −29.915 | 584.273 |
| 25.0 | 178.609 | −51.977 | 594.560 |
| 25.0 | 174.081 | −74.012 | 604.835 |
| 25.0 | 169.370 | −96.015 | 615.096 |
| 25.0 | 164.015 | −117.876 | 625.290 |
| 25.0 | 147.790 | −134.125 | 632.867 |
| 25.0 | 123.618 | −136.921 | 634.170 |
| 25.0 | 98.904 | −136.087 | 633.782 |
| 25.0 | 74.182 | −135.480 | 633.498 |
| 25.0 | 49.455 | −135.073 | 633.309 |
| 25.0 | 24.725 | −134.846 | 633.203 |
| 25.0 | −0.006 | −134.775 | 633.170 |

TABLE 1-continued

| θ | X | Y | Z |
|---|---|---|---|
| 25.0 | −24.736 | −134.846 | 633.203 |
| 25.0 | −49.465 | −135.073 | 633.309 |
| 25.0 | −74.191 | −135.480 | 633.499 |
| 25.0 | −98.913 | −136.088 | 633.782 |
| 25.0 | −123.626 | −136.921 | 634.170 |
| 25.0 | −147.797 | −134.122 | 632.865 |
| 25.0 | −164.018 | −117.870 | 625.287 |
| 25.0 | −169.372 | −96.009 | 615.093 |
| 25.0 | −174.082 | −74.006 | 604.833 |
| 25.0 | −178.610 | −51.972 | 594.558 |
| 25.0 | −182.975 | −29.910 | 584.271 |
| 25.0 | −185.257 | −7.747 | 573.936 |
| 25.0 | −170.714 | 9.465 | 565.910 |
| 25.0 | −146.942 | 15.495 | 563.098 |
| 25.0 | −122.785 | 20.290 | 560.862 |
| 25.0 | −98.461 | 24.330 | 558.978 |
| 25.0 | −73.990 | 27.561 | 557.471 |
| 25.0 | −49.399 | 29.927 | 556.368 |
| 25.0 | −24.723 | 31.378 | 555.692 |
| 26.0 | 0.000 | 30.974 | 581.420 |
| 26.0 | 24.601 | 30.561 | 581.621 |
| 26.0 | 49.169 | 29.340 | 582.217 |
| 26.0 | 73.674 | 27.339 | 583.193 |
| 26.0 | 98.088 | 24.590 | 584.534 |
| 26.0 | 122.391 | 21.128 | 586.223 |
| 26.0 | 146.562 | 16.989 | 588.241 |
| 26.0 | 170.428 | 11.744 | 590.799 |
| 26.0 | 185.392 | −4.833 | 598.884 |
| 26.0 | 183.102 | −26.680 | 609.540 |
| 26.0 | 178.611 | −48.425 | 620.146 |
| 26.0 | 174.006 | −70.150 | 630.742 |
| 26.0 | 169.273 | −91.854 | 641.327 |
| 26.0 | 163.837 | −113.395 | 651.834 |
| 26.0 | 147.117 | −128.900 | 659.396 |
| 26.0 | 122.932 | −130.717 | 660.282 |
| 26.0 | 98.375 | −129.314 | 659.598 |
| 26.0 | 73.797 | −128.255 | 659.082 |
| 26.0 | 49.203 | −127.521 | 658.724 |
| 26.0 | 24.601 | −127.094 | 658.515 |
| 26.0 | −0.005 | −126.955 | 658.447 |
| 26.0 | −24.610 | −127.094 | 658.515 |
| 26.0 | −49.212 | −127.522 | 658.724 |
| 26.0 | −73.804 | −128.256 | 659.082 |
| 26.0 | −98.382 | −129.314 | 659.598 |
| 26.0 | −122.939 | −130.718 | 660.283 |
| 26.0 | −147.123 | −128.898 | 659.395 |
| 26.0 | −163.839 | −113.390 | 651.831 |
| 26.0 | −169.274 | −91.849 | 641.325 |
| 26.0 | −174.007 | −70.146 | 630.740 |
| 26.0 | −178.612 | −48.421 | 620.144 |
| 26.0 | −183.103 | −26.676 | 609.538 |
| 26.0 | −185.392 | −4.830 | 598.883 |
| 26.0 | −170.425 | 11.745 | 590.799 |
| 26.0 | −146.559 | 16.990 | 588.241 |
| 26.0 | −122.389 | 21.128 | 586.222 |
| 26.0 | −98.087 | 24.590 | 584.534 |
| 26.0 | −73.672 | 27.339 | 583.193 |
| 26.0 | −49.168 | 29.340 | 582.217 |
| 26.0 | −24.601 | 30.561 | 581.621 |
| 27.0 | 0.000 | 32.123 | 606.814 |
| 27.0 | 24.511 | 31.774 | 606.992 |
| 27.0 | 48.997 | 30.737 | 607.520 |
| 27.0 | 73.436 | 29.028 | 608.391 |
| 27.0 | 97.807 | 26.666 | 609.594 |
| 27.0 | 122.090 | 23.672 | 611.120 |
| 27.0 | 146.267 | 20.066 | 612.957 |
| 27.0 | 170.199 | 15.459 | 615.304 |
| 27.0 | 185.508 | −0.566 | 623.470 |
| 27.0 | 183.223 | −22.125 | 634.454 |
| 27.0 | 178.628 | −43.580 | 645.387 |
| 27.0 | 173.960 | −65.024 | 656.313 |
| 27.0 | 169.208 | −86.453 | 667.231 |
| 27.0 | 163.697 | −107.700 | 678.057 |
| 27.0 | 146.563 | −122.551 | 685.624 |
| 27.0 | 122.391 | −123.558 | 686.137 |
| 27.0 | 97.967 | −121.678 | 685.180 |
| 27.0 | 73.506 | −120.240 | 684.447 |

TABLE 1-continued

| θ | X | Y | Z |
|---|---|---|---|
| 27.0 | 49.017 | −119.228 | 683.931 |
| 27.0 | 24.512 | −118.630 | 683.626 |
| 27.0 | −0.002 | −118.433 | 683.526 |
| 27.0 | −24.516 | −118.630 | 683.626 |
| 27.0 | −49.021 | −119.228 | 683.931 |
| 27.0 | −73.509 | −120.240 | 684.447 |
| 27.0 | −97.970 | −121.679 | 685.180 |
| 27.0 | −122.394 | −123.558 | 686.137 |
| 27.0 | −146.566 | −122.550 | 685.624 |
| 27.0 | −163.698 | −107.698 | 678.056 |
| 27.0 | −169.209 | −86.451 | 667.230 |
| 27.0 | −173.960 | −65.022 | 656.312 |
| 27.0 | −178.628 | −43.579 | 645.386 |
| 27.0 | −183.224 | −22.123 | 634.454 |
| 27.0 | −185.508 | −0.565 | 623.469 |
| 27.0 | −170.197 | 15.460 | 615.304 |
| 27.0 | −146.266 | 20.066 | 612.957 |
| 27.0 | −122.089 | 23.672 | 611.120 |
| 27.0 | −97.806 | 26.666 | 609.594 |
| 27.0 | −73.436 | 29.028 | 608.391 |
| 27.0 | −48.997 | 30.737 | 607.520 |
| 27.0 | −24.511 | 31.774 | 606.992 |
| 28.0 | 0.000 | 35.676 | 631.344 |
| 28.0 | 24.452 | 35.375 | 631.505 |
| 28.0 | 48.886 | 34.474 | 631.983 |
| 28.0 | 73.282 | 32.984 | 632.776 |
| 28.0 | 97.624 | 30.913 | 633.877 |
| 28.0 | 121.895 | 28.270 | 635.282 |
| 28.0 | 146.080 | 25.067 | 636.985 |
| 28.0 | 170.056 | 20.942 | 639.179 |
| 28.0 | 185.611 | 5.354 | 647.467 |
| 28.0 | 183.327 | −15.943 | 658.791 |
| 28.0 | 178.652 | −37.138 | 670.060 |
| 28.0 | 173.935 | −58.325 | 681.326 |
| 28.0 | 169.171 | −79.505 | 692.587 |
| 28.0 | 163.597 | −100.486 | 703.743 |
| 28.0 | 146.142 | −114.796 | 711.352 |
| 28.0 | 121.990 | −115.172 | 711.552 |
| 28.0 | 97.668 | −112.919 | 710.354 |
| 28.0 | 73.293 | −111.180 | 709.429 |
| 28.0 | 48.878 | −109.947 | 708.773 |
| 28.0 | 24.437 | −109.212 | 708.383 |
| 28.0 | −0.016 | −108.968 | 708.253 |
| 28.0 | −24.468 | −109.212 | 708.383 |
| 28.0 | −48.907 | −109.948 | 708.774 |
| 28.0 | −73.321 | −111.182 | 709.430 |
| 28.0 | −97.695 | −112.921 | 710.355 |
| 28.0 | −122.014 | −115.175 | 711.553 |
| 28.0 | −146.164 | −114.789 | 711.348 |
| 28.0 | −163.606 | −100.469 | 703.734 |
| 28.0 | −169.175 | −79.488 | 692.578 |
| 28.0 | −173.939 | −58.310 | 681.317 |
| 28.0 | −178.655 | −37.124 | 670.053 |
| 28.0 | −183.329 | −15.930 | 658.784 |
| 28.0 | −185.608 | 5.366 | 647.461 |
| 28.0 | −170.045 | 20.945 | 639.177 |
| 28.0 | −146.070 | 25.069 | 636.984 |
| 28.0 | −121.887 | 28.271 | 635.282 |
| 28.0 | −97.618 | 30.913 | 633.877 |
| 28.0 | −73.277 | 32.984 | 632.776 |
| 28.0 | −48.883 | 34.475 | 631.983 |
| 28.0 | −24.451 | 35.375 | 631.505 |
| 29.0 | 0.000 | 41.945 | 654.704 |
| 29.0 | 24.421 | 41.675 | 654.854 |
| 29.0 | 48.827 | 40.866 | 655.302 |
| 29.0 | 73.202 | 39.521 | 656.047 |
| 29.0 | 97.531 | 37.644 | 657.088 |
| 29.0 | 121.799 | 35.239 | 658.421 |
| 29.0 | 145.991 | 32.309 | 660.045 |
| 29.0 | 169.999 | 28.508 | 662.152 |
| 29.0 | 185.699 | 13.242 | 670.614 |
| 29.0 | 183.407 | −7.818 | 682.288 |
| 29.0 | 178.678 | −28.776 | 693.905 |
| 29.0 | 173.930 | −49.730 | 705.520 |
| 29.0 | 169.160 | −70.680 | 717.133 |
| 29.0 | 163.554 | −91.425 | 728.632 |
| 29.0 | 145.896 | −105.340 | 736.345 |

TABLE 1-continued

| θ | X | Y | Z |
|---|---|---|---|
| 29.0 | 121.762 | −105.295 | 736.320 |
| 29.0 | 97.509 | −102.781 | 734.927 |
| 29.0 | 73.187 | −100.831 | 733.846 |
| 29.0 | 48.816 | −99.440 | 733.075 |
| 29.0 | 24.411 | −98.608 | 732.614 |
| 29.0 | −0.010 | −98.331 | 732.460 |
| 29.0 | −24.430 | −98.609 | 732.614 |
| 29.0 | −48.834 | −99.441 | 733.076 |
| 29.0 | −73.204 | −100.832 | 733.846 |
| 29.0 | −97.525 | −102.783 | 734.928 |
| 29.0 | −121.777 | −105.296 | 736.321 |
| 29.0 | −145.909 | −105.336 | 736.343 |
| 29.0 | −163.560 | −91.414 | 728.626 |
| 29.0 | −169.162 | −70.670 | 717.127 |
| 29.0 | −173.932 | −49.720 | 705.515 |
| 29.0 | −178.680 | −28.767 | 693.900 |
| 29.0 | −183.408 | −7.811 | 682.284 |
| 29.0 | −185.697 | 13.249 | 670.610 |
| 29.0 | −169.992 | 28.510 | 662.151 |
| 29.0 | −145.985 | 32.310 | 660.045 |
| 29.0 | −121.794 | 35.240 | 658.421 |
| 29.0 | −97.527 | 37.645 | 657.088 |
| 29.0 | −73.199 | 39.522 | 656.047 |
| 29.0 | −48.825 | 40.866 | 655.302 |
| 29.0 | −24.420 | 41.675 | 654.854 |
| 30.0 | 0.000 | 51.170 | 676.592 |
| 30.0 | 24.441 | 50.916 | 676.739 |
| 30.0 | 48.868 | 50.153 | 677.179 |
| 30.0 | 73.267 | 48.882 | 677.913 |
| 30.0 | 97.623 | 47.105 | 678.939 |
| 30.0 | 121.923 | 44.821 | 680.258 |
| 30.0 | 146.153 | 42.034 | 681.867 |
| 30.0 | 170.198 | 38.368 | 683.983 |
| 30.0 | 185.821 | 23.186 | 692.749 |
| 30.0 | 183.411 | 2.319 | 704.797 |
| 30.0 | 178.648 | −18.444 | 716.784 |
| 30.0 | 173.880 | −39.206 | 728.771 |
| 30.0 | 169.107 | −59.967 | 740.757 |
| 30.0 | 163.421 | −80.501 | 752.612 |
| 30.0 | 145.485 | −94.016 | 760.415 |
| 30.0 | 121.318 | −93.624 | 760.189 |
| 30.0 | 97.066 | −90.982 | 758.664 |
| 30.0 | 72.739 | −88.929 | 757.479 |
| 30.0 | 48.355 | −87.466 | 756.634 |
| 30.0 | 23.933 | −86.592 | 756.129 |
| 30.0 | −0.506 | −86.309 | 755.966 |
| 30.0 | −24.895 | −86.616 | 756.143 |
| 30.0 | −49.265 | −87.510 | 756.659 |
| 30.0 | −73.597 | −88.992 | 757.515 |
| 30.0 | −97.872 | −91.061 | 758.709 |
| 30.0 | −122.070 | −93.716 | 760.242 |
| 30.0 | −146.158 | −93.822 | 760.303 |
| 30.0 | −163.699 | −79.984 | 752.314 |
| 30.0 | −169.225 | −59.451 | 740.459 |
| 30.0 | −173.989 | −38.733 | 728.498 |
| 30.0 | −178.747 | −18.014 | 716.536 |
| 30.0 | −183.500 | 2.706 | 704.573 |
| 30.0 | −185.722 | 23.526 | 692.552 |
| 30.0 | −169.864 | 38.473 | 683.923 |
| 30.0 | −145.852 | 42.071 | 681.845 |
| 30.0 | −121.672 | 44.848 | 680.242 |
| 30.0 | −97.421 | 47.122 | 678.930 |
| 30.0 | −73.115 | 48.892 | 677.908 |
| 30.0 | −48.767 | 50.157 | 677.177 |
| 30.0 | −24.390 | 50.917 | 676.738 |
| 31.0 | 0.000 | 63.034 | 697.015 |
| 31.0 | 24.425 | 62.785 | 697.165 |
| 31.0 | 48.837 | 62.037 | 697.614 |
| 31.0 | 73.220 | 60.790 | 698.363 |
| 31.0 | 97.563 | 59.046 | 699.411 |
| 31.0 | 121.849 | 56.806 | 700.757 |
| 31.0 | 146.067 | 54.071 | 702.401 |
| 31.0 | 170.107 | 50.489 | 704.553 |
| 31.0 | 185.821 | 35.549 | 713.530 |
| 31.0 | 183.473 | 14.911 | 725.930 |
| 31.0 | 178.704 | −5.624 | 738.269 |
| 31.0 | 173.938 | −26.160 | 750.609 |

TABLE 1-continued

| θ | X | Y | Z |
|---|---|---|---|
| 31.0 | 169.175 | −46.697 | 762.948 |
| 31.0 | 163.588 | −67.034 | 775.168 |
| 31.0 | 145.851 | −80.583 | 783.309 |
| 31.0 | 121.716 | −80.306 | 783.143 |
| 31.0 | 97.488 | −77.647 | 781.545 |
| 31.0 | 73.181 | −75.576 | 780.300 |
| 31.0 | 48.815 | −74.095 | 779.411 |
| 31.0 | 24.410 | −73.207 | 778.877 |
| 31.0 | −0.014 | −72.911 | 778.699 |
| 31.0 | −24.437 | −73.208 | 778.877 |
| 31.0 | −48.840 | −74.097 | 779.412 |
| 31.0 | −73.205 | −75.578 | 780.301 |
| 31.0 | −97.510 | −77.649 | 781.546 |
| 31.0 | −121.738 | −80.309 | 783.144 |
| 31.0 | −145.870 | −80.577 | 783.306 |
| 31.0 | −163.596 | −67.019 | 775.159 |
| 31.0 | −169.178 | −46.683 | 762.940 |
| 31.0 | −173.941 | −26.147 | 750.601 |
| 31.0 | −178.706 | −5.612 | 738.262 |
| 31.0 | −183.475 | 14.922 | 725.924 |
| 31.0 | −185.819 | 35.559 | 713.524 |
| 31.0 | −170.098 | 50.492 | 704.551 |
| 31.0 | −146.059 | 54.072 | 702.400 |
| 31.0 | −121.842 | 56.807 | 700.757 |
| 31.0 | −97.557 | 59.047 | 699.411 |
| 31.0 | −73.216 | 60.790 | 698.363 |
| 31.0 | −48.834 | 62.037 | 697.614 |
| 31.0 | −24.424 | 62.785 | 697.165 |

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A transition duct having an inlet opening and an outlet opening and a body portion extending between said inlet and outlet openings at respective inlet and outlet ends, said inlet opening defining a generally circular cross-section for said body portion and having a geometric center, said body portion having an internal profile substantially in accordance with coordinate values X, Y and Z at sections defined by a respective angle θ, as set forth in Table 1, where each of said X, Y and Z coordinates are taken at a sweep angle θ passing through said section origin and measured from a first plane defined by said inlet end and increasing toward a second plane defined by said outlet end, said first plane and said section planes intersecting at an angle origin line about which said angle θ is measured, said X and Y coordinate values are determined relative to a section origin at a substantially central geometric location within each respective section, and said Z coordinate values are measured along a Z-axis extending perpendicular to said first plane, and having an origin at the center of said generally circular inlet opening and increasing toward said outlet end.

2. The transition duct of claim 1, wherein said internal profile may be provided within an envelope of ±6.350 mm normal to any surface with said coordinate values X, Y and Z and said angles θ.

3. The transition duct of claim 1, wherein the distance between said angle origin line about which said angle θ is measured and said inlet origin at the center of said generally circular inlet opening is approximately 1223 mm.

4. The transition duct of claim 1, wherein said coordinates X, Y and Z represent unitless scaled values.

5. A transition duct having an inlet opening and an outlet opening and a body portion extending between said inlet and outlet openings at respective inlet and outlet ends, said inlet opening defining a generally circular cross-section for said body portion and having a geometric center, said body portion having an internal profile including first, second, third and fourth profile sections defining respective geometric centers comprising section origins, said first, second, third and fourth profile sections located approximately at angles Θ of 1.0°, 10.0°, 21.0° and 30.0°, respectively, taken at a sweep angle Θ passing through a respective one of said section origins and measured from a first plane defined by said inlet end and increasing toward a second plane defined by said outlet end, said first plane and said section planes intersecting at an angle origin line about which said angle Θ is measured, each said section defining a Cartesian X Y coordinate origin located at said geometric center within each said section with corresponding quadrants determined relative to a respective section origin within each respective section, each said section defining quadrants extending from said Cartesian X Y coordinate origin for each section, said quadrants for each section comprising:

a first quadrant corresponding to positive X and positive Y values relative to the Cartesian X Y coordinate origin;

a second quadrant corresponding to negative X and positive Y values relative to the Cartesian X Y coordinate origin;

a third quadrant corresponding to negative X and negative Y values relative to the Cartesian X Y coordinate origin; and a fourth quadrant corresponding to positive X and negative Y values relative to the Cartesian X Y coordinate origin;

wherein said first section comprises a generally circular cross-section; said second section comprises a first side extending from the third quadrant to the second quadrant, a second side extending from the fourth quadrant to the first quadrant, an outer side extending between said first and second quadrants and curved concave inwardly toward the coordinate origin, an inner side extending between said third and fourth quadrants and curved concave inwardly toward the coordinate origin, said first and second sides extending in diverging relation from said inner side toward said outer side;

said third section comprises a first substantially linear side extending from the third quadrant to the second quadrant, a second substantially linear side extending from the fourth quadrant to the first quadrant, at least one of the first and second substantially linear sides having a linear portion, an outer side extending between said first and second quadrants and curved concave inwardly toward the coordinate origin, an inner side extending between said third and fourth quadrants and curved concave inwardly toward the coordinate origin, said first and second sides extending in diverging relation from said inner side toward said outer side; and said fourth section comprises a first substantially linear side extending from the third quadrant to the second quadrant, a second substantially linear side extending from the fourth quadrant to the first quadrant, an outer side extending between said first and second quadrants and curved concave inwardly toward the coordinate origin, an inner side extending between said third and fourth quadrants and curved concave outwardly away from the coordinate origin, said first and second sides extending in diverging relation from said inner toward said outer side.

6. The transition duct of claim 5, wherein said second profile section is substantially in accordance with coordinate values X, Y and Z as follows:

| θ | X | Y | Z |
|---|---|---|---|
| 10.0 | 0.000 | 137.813 | 191.359 |
| 10.0 | 27.411 | 135.748 | 191.723 |
| 10.0 | 54.217 | 129.733 | 192.783 |
| 10.0 | 79.932 | 120.143 | 194.474 |
| 10.0 | 104.216 | 107.434 | 196.715 |
| 10.0 | 126.863 | 92.065 | 199.425 |
| 10.0 | 147.770 | 74.463 | 202.529 |
| 10.0 | 166.512 | 54.675 | 206.018 |
| 10.0 | 177.490 | 30.042 | 210.362 |
| 10.0 | 178.983 | 3.031 | 215.124 |
| 10.0 | 177.868 | −24.041 | 219.898 |
| 10.0 | 174.883 | −50.974 | 224.647 |
| 10.0 | 170.025 | −77.642 | 229.349 |
| 10.0 | 163.264 | −103.904 | 233.980 |
| 10.0 | 150.655 | −127.815 | 238.196 |
| 10.0 | 130.213 | −145.740 | 241.357 |
| 10.0 | 106.213 | −158.965 | 243.689 |
| 10.0 | 80.849 | −169.438 | 245.535 |
| 10.0 | 54.457 | −177.055 | 246.878 |
| 10.0 | 27.363 | −181.705 | 247.698 |
| 10.0 | −0.092 | −183.273 | 247.975 |
| 10.0 | −27.537 | −181.685 | 247.695 |
| 10.0 | −54.619 | −177.018 | 246.872 |
| 10.0 | −80.997 | −169.386 | 245.526 |
| 10.0 | −106.346 | −158.902 | 243.677 |
| 10.0 | −130.330 | −145.666 | 241.344 |
| 10.0 | −150.734 | −127.715 | 238.178 |
| 10.0 | −163.298 | −103.791 | 233.960 |
| 10.0 | −170.049 | −77.535 | 229.330 |
| 10.0 | −174.898 | −50.875 | 224.630 |
| 10.0 | −177.875 | −23.950 | 219.882 |
| 10.0 | −178.983 | 3.113 | 215.110 |
| 10.0 | −177.475 | 30.114 | 210.349 |
| 10.0 | −166.474 | 54.727 | 206.009 |
| 10.0 | −147.729 | 74.500 | 202.522 |
| 10.0 | −126.826 | 92.093 | 199.420 |
| 10.0 | −104.184 | 107.453 | 196.712 |
| 10.0 | −79.906 | 120.154 | 194.472 |
| 10.0 | −54.199 | 129.738 | 192.783 |
| 10.0 | −27.401 | 135.750 | 191.723 |

where said X and Y coordinate values are determined relative to said Cartesian X Y origin, and said Z coordinate values are measured along a Z-axis extending perpendicular to said first plane, and having an origin at the center of said generally circular inlet opening and increasing toward said outlet end.

7. The transition duct of claim 6, wherein said internal profile may be provided within an envelope of ±6.350 mm normal to any surface with said coordinate values X, Y and Z.

8. The transition duct of claim 6, wherein said coordinates X, Y and Z represent unitless scaled values.

9. The transition duct of claim 5, wherein said third profile section is substantially in accordance with coordinate values X, Y and Z as follows:

| θ | X | Y | Z |
|---|---|---|---|
| 21.0 | 0.000 | 49.344 | 450.548 |
| 21.0 | 25.439 | 48.416 | 450.904 |
| 21.0 | 50.731 | 45.704 | 451.946 |
| 21.0 | 75.759 | 41.344 | 453.619 |
| 21.0 | 100.439 | 35.502 | 455.861 |
| 21.0 | 124.720 | 28.351 | 458.606 |
| 21.0 | 148.584 | 20.062 | 461.788 |
| 21.0 | 171.580 | 10.011 | 465.647 |

-continued

| θ | X | Y | Z |
|---|---|---|---|
| 21.0 | 184.387 | −9.886 | 473.285 |
| 21.0 | 182.474 | −33.498 | 482.348 |
| 21.0 | 178.774 | −57.018 | 491.377 |
| 21.0 | 174.619 | −80.473 | 500.380 |
| 21.0 | 169.984 | −103.848 | 509.353 |
| 21.0 | 164.741 | −127.108 | 518.282 |
| 21.0 | 150.617 | −146.420 | 525.695 |
| 21.0 | 126.933 | −154.035 | 528.618 |
| 21.0 | 101.586 | −156.315 | 529.493 |
| 21.0 | 76.196 | −158.126 | 530.188 |
| 21.0 | 50.772 | −159.453 | 530.698 |
| 21.0 | 25.323 | −160.273 | 531.013 |
| 21.0 | −0.139 | −160.554 | 531.120 |
| 21.0 | −25.587 | −160.267 | 531.010 |
| 21.0 | −51.022 | −159.442 | 530.694 |
| 21.0 | −76.432 | −158.111 | 530.183 |
| 21.0 | −101.808 | −156.297 | 529.487 |
| 21.0 | −127.140 | −154.015 | 528.610 |
| 21.0 | −150.771 | −146.309 | 525.652 |
| 21.0 | −164.791 | −126.946 | 518.220 |
| 21.0 | −170.016 | −103.695 | 509.294 |
| 21.0 | −174.646 | −80.332 | 500.326 |
| 21.0 | −178.796 | −56.890 | 491.328 |
| 21.0 | −182.491 | −33.382 | 482.304 |
| 21.0 | −184.369 | −9.784 | 473.245 |
| 21.0 | −171.502 | 10.066 | 465.626 |
| 21.0 | −148.507 | 20.091 | 461.777 |
| 21.0 | −124.655 | 28.373 | 458.598 |
| 21.0 | −100.385 | 35.517 | 455.856 |
| 21.0 | −75.718 | 41.353 | 453.616 |
| 21.0 | −50.704 | 45.707 | 451.944 |
| 21.0 | −25.425 | 48.417 | 450.904 |

where said X and Y coordinate values are determined relative to said Cartesian X Y origin, and said Z coordinate values are measured along a Z-axis extending perpendicular to said first plane, and having an origin at the center of said generally circular inlet opening and increasing toward said outlet end.

10. The transition duct of claim 9, wherein said internal profile may be provided within an envelope of ±6.350 mm normal to any surface with said coordinate values X, Y and Z.

11. The transition duct of claim 9, wherein said coordinates X, Y and Z represent unitless scaled values.

12. A transition duct having an inlet opening and an outlet opening and a body portion extending between said inlet and outlet openings at respective inlet and outlet ends, said inlet opening defining a generally circular cross-section for said body portion and having a geometric center, said body portion having an internal profile including first, second, third and fourth profile sections substantially in accordance with coordinate values X, Y and Z located at angles θ of 1.0°, 10.0°, 21.0° and 30.0°, respectively, as follows:

| θ | X | Y | Z |
|---|---|---|---|
| 1.0 | 0.000 | 174.094 | 18.310 |
| 1.0 | 27.361 | 171.930 | 18.348 |
| 1.0 | 54.047 | 165.510 | 18.460 |
| 1.0 | 79.411 | 155.021 | 18.643 |
| 1.0 | 102.856 | 140.749 | 18.892 |
| 1.0 | 123.849 | 123.068 | 19.200 |
| 1.0 | 141.929 | 102.418 | 19.561 |
| 1.0 | 156.693 | 79.282 | 19.965 |
| 1.0 | 167.221 | 53.951 | 20.407 |
| 1.0 | 172.981 | 27.122 | 20.875 |
| 1.0 | 174.705 | −0.271 | 21.353 |
| 1.0 | 172.481 | −27.629 | 21.831 |

-continued

| θ | X | Y | Z |
|---|---|---|---|
| 1.0 | 166.351 | −54.383 | 22.298 |
| 1.0 | 156.392 | −79.957 | 22.744 |
| 1.0 | 142.206 | −103.440 | 23.154 |
| 1.0 | 124.128 | −124.084 | 23.515 |
| 1.0 | 103.029 | −141.638 | 23.821 |
| 1.0 | 79.494 | −155.761 | 24.067 |
| 1.0 | 54.074 | −166.115 | 24.248 |
| 1.0 | 27.365 | −172.441 | 24.359 |
| 1.0 | 0.000 | −174.571 | 24.396 |
| 1.0 | −27.365 | −172.441 | 24.359 |
| 1.0 | −54.074 | −166.115 | 24.248 |
| 1.0 | −79.494 | −155.761 | 24.067 |
| 1.0 | −103.029 | −141.638 | 23.821 |
| 1.0 | −124.128 | −124.084 | 23.515 |
| 1.0 | −142.206 | −103.440 | 23.154 |
| 1.0 | −156.392 | −79.957 | 22.744 |
| 1.0 | −166.351 | −54.383 | 22.298 |
| 1.0 | −172.481 | −27.629 | 21.831 |
| 1.0 | −174.705 | −0.271 | 21.353 |
| 1.0 | −172.981 | 27.122 | 20.875 |
| 1.0 | −167.221 | 53.951 | 20.407 |
| 1.0 | −156.693 | 79.282 | 19.965 |
| 1.0 | −141.929 | 102.418 | 19.561 |
| 1.0 | −123.849 | 123.068 | 19.200 |
| 1.0 | −102.856 | 140.749 | 18.892 |
| 1.0 | −79.411 | 155.021 | 18.643 |
| 1.0 | −54.047 | 165.510 | 18.460 |
| 1.0 | −27.361 | 171.930 | 18.348 |
| 10.0 | 0.000 | 137.813 | 191.359 |
| 10.0 | 27.411 | 135.748 | 191.723 |
| 10.0 | 54.217 | 129.733 | 192.783 |
| 10.0 | 79.932 | 120.143 | 194.474 |
| 10.0 | 104.216 | 107.434 | 196.715 |
| 10.0 | 126.863 | 92.065 | 199.425 |
| 10.0 | 147.770 | 74.463 | 202.529 |
| 10.0 | 166.512 | 54.675 | 206.018 |
| 10.0 | 177.490 | 30.042 | 210.362 |
| 10.0 | 178.983 | 3.031 | 215.124 |
| 10.0 | 177.868 | −24.041 | 219.898 |
| 10.0 | 174.883 | −50.974 | 224.647 |
| 10.0 | 170.025 | −77.642 | 229.349 |
| 10.0 | 163.264 | −103.904 | 233.980 |
| 10.0 | 150.655 | −127.815 | 238.196 |
| 10.0 | 130.213 | −145.740 | 241.357 |
| 10.0 | 106.213 | −158.965 | 243.689 |
| 10.0 | 80.849 | −169.438 | 245.535 |
| 10.0 | 54.457 | −177.055 | 246.878 |
| 10.0 | 27.363 | −181.705 | 247.698 |
| 10.0 | −0.092 | −183.273 | 247.975 |
| 10.0 | −27.537 | −181.685 | 247.695 |
| 10.0 | −54.619 | −177.018 | 246.872 |
| 10.0 | −80.997 | −169.386 | 245.526 |
| 10.0 | −106.346 | −158.902 | 243.677 |
| 10.0 | −130.330 | −145.666 | 241.344 |
| 10.0 | −150.734 | −127.715 | 238.178 |
| 10.0 | −163.298 | −103.791 | 233.960 |
| 10.0 | −170.049 | −77.535 | 229.330 |
| 10.0 | −174.898 | −50.875 | 224.630 |
| 10.0 | −177.875 | −23.950 | 219.882 |
| 10.0 | −178.983 | 3.113 | 215.110 |
| 10.0 | −177.475 | 30.114 | 210.349 |
| 10.0 | −166.474 | 54.727 | 206.009 |
| 10.0 | −147.729 | 74.500 | 202.522 |
| 10.0 | −126.826 | 92.093 | 199.420 |
| 10.0 | −104.184 | 107.453 | 196.712 |
| 10.0 | −79.906 | 120.154 | 194.472 |
| 10.0 | −54.199 | 129.738 | 192.783 |
| 10.0 | −27.401 | 135.750 | 191.723 |
| 21.0 | 0.000 | 49.344 | 450.548 |
| 21.0 | 25.439 | 48.416 | 450.904 |
| 21.0 | 50.731 | 45.704 | 451.946 |
| 21.0 | 75.759 | 41.344 | 453.619 |
| 21.0 | 100.439 | 35.502 | 455.861 |
| 21.0 | 124.720 | 28.351 | 458.606 |
| 21.0 | 148.584 | 20.062 | 461.788 |
| 21.0 | 171.580 | 10.011 | 465.647 |
| 21.0 | 184.387 | −9.886 | 473.285 |

-continued

| θ | X | Y | Z |
|---|---|---|---|
| 21.0 | 182.474 | −33.498 | 482.348 |
| 21.0 | 178.774 | −57.018 | 491.377 |
| 21.0 | 174.619 | −80.473 | 500.380 |
| 21.0 | 169.984 | −103.848 | 509.353 |
| 21.0 | 164.741 | −127.108 | 518.282 |
| 21.0 | 150.617 | −146.420 | 525.695 |
| 21.0 | 126.933 | −154.035 | 528.618 |
| 21.0 | 101.586 | −156.315 | 529.493 |
| 21.0 | 76.196 | −158.126 | 530.188 |
| 21.0 | 50.772 | −159.453 | 530.698 |
| 21.0 | 25.323 | −160.273 | 531.013 |
| 21.0 | −0.139 | −160.554 | 531.120 |
| 21.0 | −25.587 | −160.267 | 531.010 |
| 21.0 | −51.022 | −159.442 | 530.694 |
| 21.0 | −76.432 | −158.111 | 530.183 |
| 21.0 | −101.808 | −156.297 | 529.487 |
| 21.0 | −127.140 | −154.015 | 528.610 |
| 21.0 | −150.771 | −146.309 | 525.652 |
| 21.0 | −164.791 | −126.946 | 518.220 |
| 21.0 | −170.016 | −103.695 | 509.294 |
| 21.0 | −174.646 | −80.332 | 500.326 |
| 21.0 | −178.796 | −56.890 | 491.328 |
| 21.0 | −182.491 | −33.382 | 482.304 |
| 21.0 | −184.369 | −9.784 | 473.245 |
| 21.0 | −171.502 | 10.066 | 465.626 |
| 21.0 | −148.507 | 20.091 | 461.777 |
| 21.0 | −124.655 | 28.373 | 458.598 |
| 21.0 | −100.385 | 35.517 | 455.856 |
| 21.0 | −75.718 | 41.353 | 453.616 |
| 21.0 | −50.704 | 45.707 | 451.944 |
| 21.0 | −25.425 | 48.417 | 450.904 |
| 30.0 | 0.000 | 51.170 | 676.592 |
| 30.0 | 24.441 | 50.916 | 676.739 |
| 30.0 | 48.868 | 50.153 | 677.179 |
| 30.0 | 73.267 | 48.882 | 677.913 |
| 30.0 | 97.623 | 47.105 | 678.939 |
| 30.0 | 121.923 | 44.821 | 680.258 |
| 30.0 | 146.153 | 42.034 | 681.867 |
| 30.0 | 170.198 | 38.368 | 683.983 |
| 30.0 | 185.821 | 23.186 | 692.749 |
| 30.0 | 183.411 | 2.319 | 704.797 |
| 30.0 | 178.648 | −18.444 | 716.784 |
| 30.0 | 173.880 | −39.206 | 728.771 |
| 30.0 | 169.107 | −59.967 | 740.757 |
| 30.0 | 163.421 | −80.501 | 752.612 |
| 30.0 | 145.485 | −94.016 | 760.415 |
| 30.0 | 121.318 | −93.624 | 760.189 |
| 30.0 | 97.066 | −90.982 | 758.664 |
| 30.0 | 72.739 | −88.929 | 757.479 |
| 30.0 | 48.355 | −87.466 | 756.634 |
| 30.0 | 23.933 | −86.592 | 756.129 |
| 30.0 | −0.506 | −86.309 | 755.966 |
| 30.0 | −24.895 | −86.616 | 756.143 |
| 30.0 | −49.265 | −87.510 | 756.659 |
| 30.0 | −73.597 | −88.992 | 757.515 |
| 30.0 | −97.872 | −91.061 | 758.709 |
| 30.0 | −122.070 | −93.716 | 760.242 |
| 30.0 | −146.158 | −93.822 | 760.303 |
| 30.0 | −163.699 | −79.984 | 752.314 |
| 30.0 | −169.225 | −59.451 | 740.459 |
| 30.0 | −173.989 | −38.733 | 728.498 |
| 30.0 | −178.747 | −18.014 | 716.536 |
| 30.0 | −183.500 | 2.706 | 704.573 |
| 30.0 | −185.722 | 23.526 | 692.552 |
| 30.0 | −169.864 | 38.473 | 683.923 |
| 30.0 | −145.852 | 42.071 | 681.845 |
| 30.0 | −121.672 | 44.848 | 680.242 |
| 30.0 | −97.421 | 47.122 | 678.930 |
| 30.0 | −73.115 | 48.892 | 677.908 |
| 30.0 | −48.767 | 50.157 | 677.177 |
| 30.0 | −24.390 | 50.917 | 676.738 |

where each of said X, Y and Z coordinates are taken at a sweep angle θ passing through said section origin and measured from a first plane defined by said inlet end and increasing toward a second plane defined by said outlet end, said first plane and said section planes intersecting at an angle origin line about which said angle θ is measured, said X and Y coordinate values are determined relative to the section origin at a substantially central geometric location within each respective section, and said Z coordinate values are measured along a Z-axis extending perpendicular to said first plane, and having an origin at the center of said generally circular inlet opening and increasing toward said outlet end.

13. The transition duct of claim 12, wherein said internal profile may be provided within an envelope of ±6.350 mm normal to any surface with said coordinate values X, Y and Z and said angles θ.

14. The transition duct of claim 12, wherein the distance between said angle origin line about which said angle θ is measured and said inlet origin at the center of said generally circular inlet opening is approximately 1223 mm.

15. The transition duct of claim 12, wherein said coordinates X, Y and Z represent unitless scaled values.

16. The transition duct of claim 5, wherein said outer side of said third section comprises less curvature along a length of said outer side between said first and second sides of said third section than a curvature of said outer side of said second section.

17. The transition duct of claim 16, wherein said inner side of said third section comprises less curvature along a length of said inner side between said first and second sides of said third section than a curvature of said inner side of said second section.

18. The transition duct of claim 5, wherein said inner and outer sides of said third section are joined to said first and second sides of said third section at respective corners, each of said corners defining a radius that is less than a radius of each of said sides of said third section to define said third section as an expanded rectangle.

* * * * *